United States Patent
Kumar et al.

(10) Patent No.: US 12,485,790 B2
(45) Date of Patent: *Dec. 2, 2025

(54) SYSTEM AND METHOD FOR VEHICLE SYSTEM CHARGING

(71) Applicant: Transportation IP Holdings, LLC, Norwalk, CT (US)

(72) Inventors: Ajith Kuttannair Kumar, Erie, PA (US); Subhas Chandra Das, Bangalore (IN); Sarit Ratadiya, Bangalore (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 209 days.

This patent is subject to a terminal disclaimer.

(21) Appl. No.: 17/584,111

(22) Filed: Jan. 25, 2022

(65) Prior Publication Data
US 2023/0083236 A1 Mar. 16, 2023

Related U.S. Application Data

(63) Continuation-in-part of application No. 17/476,180, filed on Sep. 15, 2021.

(51) Int. Cl.
*B60L 53/67* (2019.01)
*B60L 7/10* (2006.01)
(Continued)

(52) U.S. Cl.
CPC ............... *B60L 53/67* (2019.02); *B60L 7/10* (2013.01); *B60L 53/62* (2019.02); *B60L 53/65* (2019.02);
(Continued)

(58) Field of Classification Search
CPC ...... B60L 15/2009; B60L 53/20; B60L 58/12; H02J 7/0048; H02J 7/00712; H02J 7/24; H02P 3/18; H02P 27/06
See application file for complete search history.

(56) References Cited

U.S. PATENT DOCUMENTS

| 4,093,900 | A | 6/1978 | Plunkett |
| 8,371,230 | B2 * | 2/2013 | Kumar ...................... B61C 7/04 |
| | | | 105/35 |

(Continued)

FOREIGN PATENT DOCUMENTS

| DE | 10 2018 209761 A1 | 12/2019 | |
| EP | 1000796 A2 * | 5/2000 | .............. B60L 1/003 |

(Continued)

OTHER PUBLICATIONS

Extended European Search Report for corresponding EP Application No. 32150719.5 dated Jun. 26, 2023 (20 pages).

(Continued)

*Primary Examiner* — Kawing Chan
(74) *Attorney, Agent, or Firm* — K&L Gates LLP

(57) ABSTRACT

A controller may control a transfer of electric energy between two or more energy storage devices of a plurality of energy storage devices, at least one energy storage device being disposed onboard a vehicle system, and identify a transfer restriction on the transfer. The controller may change a transfer characteristic based at least in part on the transfer restriction. A system may include a controller to monitor transfer of electric energy between one or more energy storage devices disposed onboard one or more vehicle systems and energy transfer substations that are offboard the one or more vehicle systems. A method may include controlling a transfer of electric energy between two or more energy storage devices, at least one energy storage device being disposed onboard a vehicle system, identifying a transfer restriction on the transfer, and changing a transfer characteristic based at least in part on the transfer restriction.

21 Claims, 8 Drawing Sheets

(51) Int. Cl.
  *B60L 53/62*    (2019.01)
  *B60L 53/65*    (2019.01)
  *B60L 53/66*    (2019.01)
  *B60L 58/12*    (2019.01)
  *H02J 7/14*     (2006.01)
  *H02J 7/16*     (2006.01)
  *H02P 3/18*     (2006.01)
  *H02P 27/06*    (2006.01)

(52) U.S. Cl.
  CPC ............ *B60L 53/665* (2019.02); *B60L 58/12* (2019.02); *H02J 7/1423* (2013.01); *H02J 7/16* (2013.01); *H02P 3/18* (2013.01); *H02P 27/06* (2013.01)

(56) References Cited

U.S. PATENT DOCUMENTS

| | | |
|---|---|---|
| 2005/0284676 A1 | 12/2005 | King et al. |
| 2009/0066272 A1* | 3/2009 | Jobard .................... B60L 7/003 318/375 |
| 2009/0224705 A1* | 9/2009 | Jobard ..................... B60L 7/06 318/380 |
| 2011/0025267 A1* | 2/2011 | Kamen ................. B60L 53/665 320/109 |
| 2011/0204720 A1* | 8/2011 | Ruiz ..................... B60L 53/305 307/66 |
| 2012/0038214 A1 | 2/2012 | King et al. |
| 2012/0316717 A1 | 12/2012 | Ruiz et al. |
| 2014/0210398 A1 | 7/2014 | Powell et al. |
| 2018/0186357 A1 | 7/2018 | Deshpande et al. |
| 2019/0299788 A1* | 10/2019 | Oyama ................... B60L 53/20 |
| 2019/0324486 A1* | 10/2019 | Jasmin ................... G06Q 50/06 |

FOREIGN PATENT DOCUMENTS

| | | |
|---|---|---|
| JP | 2005168085 A | 6/2005 |
| JP | 2010110173 A | 5/2010 |
| JP | 2011239662 A | 11/2011 |
| JP | 2014171380 A | 9/2014 |
| JP | 2015019465 A | 1/2015 |
| JP | 2015029384 A | 2/2015 |
| JP | 2019097334 A | 6/2019 |
| JP | 2019140774 A | 8/2019 |
| JP | 2020115704 A | 7/2020 |
| JP | 2021044972 A | 3/2021 |
| JP | 2021141760 A | 9/2021 |
| WO | 2014021364 A1 | 2/2014 |

OTHER PUBLICATIONS

Extended European Search Report mailed 09-Feb. 2023 for corresponding European Patent Application No. 22 188 062 (7 pages).
First Office Action mailed Dec. 22, 2023 for corresponding Japanese Patent Application No. 2023-1302 (16 pages).

* cited by examiner

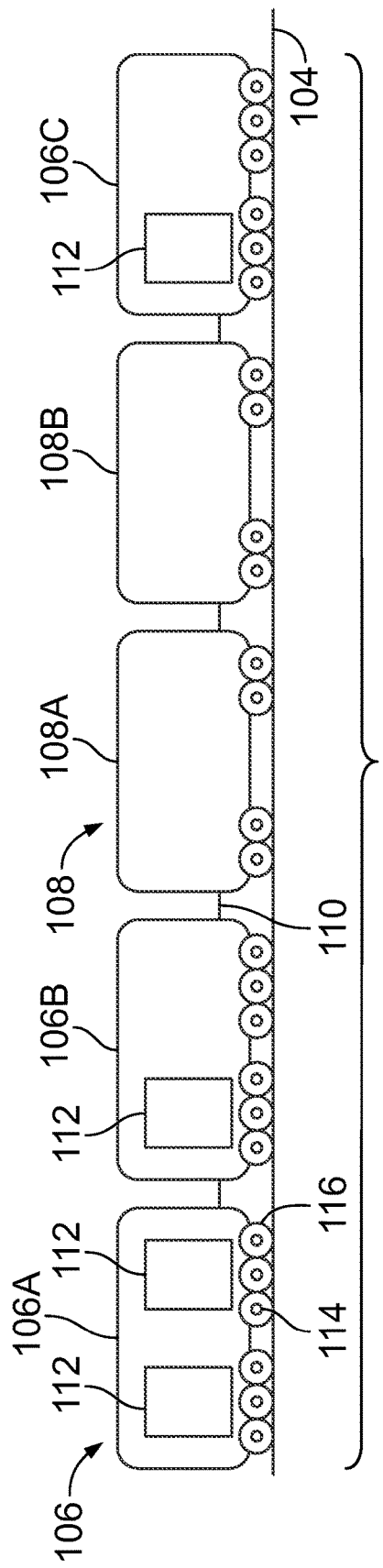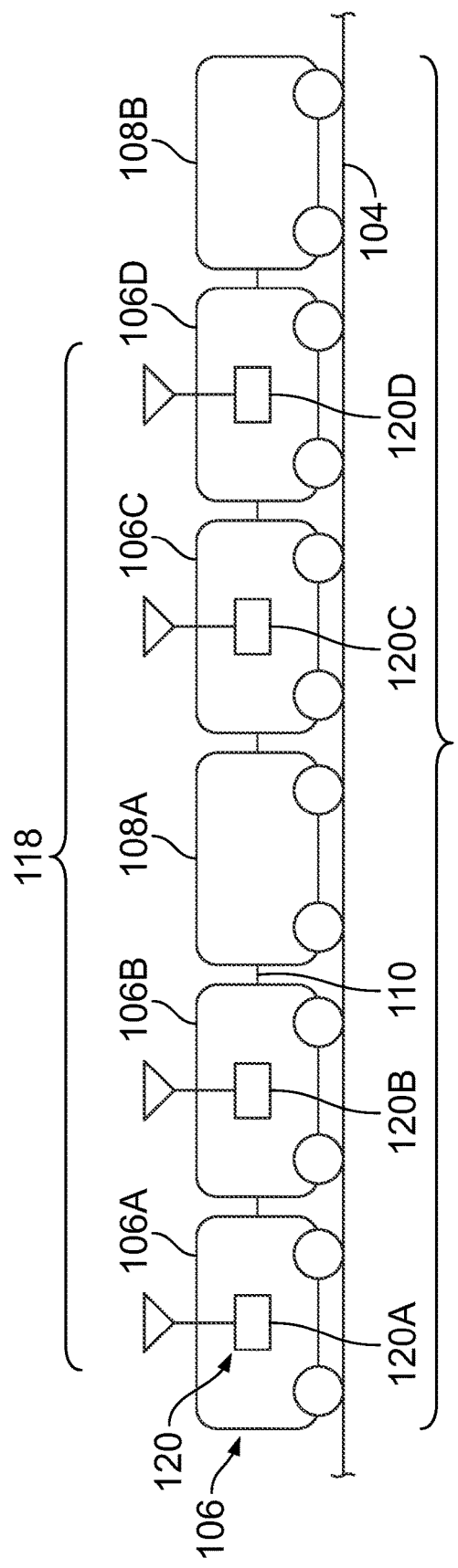

SYSTEM AND METHOD FOR VEHICLE SYSTEM CHARGING

CROSS REFERENCE TO RELATED APPLICATION

This application is a continuation-in-part of U.S. application Ser. No. 17/476,180, filed 15 Sep. 2021, the entire contents of which are incorporated herein by reference.

BACKGROUND

Technical Field

The disclosed subject matter described herein relates to a system and method for vehicle system charging.

Discussion of Art

Some vehicle systems include electric supply systems that supply some or all the requisite propulsion power for the vehicle system. As the number of vehicle systems that rely on electric power for propulsion increases, the demand for electric power and the time required for charging at charging stations or facilities that include charging stations may increase. A vehicle system that needs charging may have to wait if the charging station(s) are occupied by other vehicle systems or if the available charging station(s) is not equipped to charge the vehicle system. The charging stations may not be managed to permit multiple vehicle systems that need recharging to receive a required amount of electric energy or power to complete a trip in a required time and/or at a required cost. It may be desirable to have a system and method that differs from those that are currently available.

BRIEF DESCRIPTION

In accordance with one example or aspect, a controller controls a transfer of electric energy between two or more energy storage devices of a plurality of energy storage devices, at least one energy storage device being disposed onboard a vehicle system and identifies a transfer restriction on the transfer. The controller changes a transfer characteristic based at least in part on the transfer restriction.

In accordance with one example or aspect, a system includes a controller to monitor transfer of electric energy between one or more energy storage devices disposed onboard one or more vehicle systems and energy transfer substations that are offboard the one or more vehicle systems. The controller identifies a transfer restriction on one or more of (a) the transfer of the electric energy from the one or more vehicle systems to the energy transfer substations or (b) the transfer of the electric energy from the energy transfer substations to the one or more energy storage devices onboard the one or more vehicle systems. The controller changes one or more of a transfer amount or a transfer rate of the electric energy between the one or more energy storage devices onboard the one or more vehicle systems and the energy transfer substations based on the transfer restriction.

In accordance with one example or aspect, a method may include controlling a transfer of electric energy between two or more energy storage devices of a plurality of energy storage devices, at least one energy storage device being disposed onboard a vehicle system and identifying a transfer restriction on the transfer. The method may include changing a transfer characteristic based at least in part on the transfer restriction.

In accordance with one example or aspect, a vehicle system may include an inverter device coupled with a motor. The inverter device may receive from the motor electric energy generated by dynamic braking of the motor. The vehicle system may include an energy storage device coupled with the inverter device and a variable resistive component disposed between the inverter device and the energy storage device. The variable resistive component may control a direction of conduction of the electric energy from the inverter device toward one or more of the energy storage device, a resistive grid, or a system load. The variable resistive component may control the direction of conduction of the electric energy from the inverter device based on one or more of: a first amount of the electric energy conducted out from the inverter device, a transfer rate of the electric energy conducted from the inverter device, or one or more characteristics of the energy storage device.

BRIEF DESCRIPTION OF THE DRAWINGS

The inventive subject matter may be understood from reading the following description of non-limiting embodiments, with reference to the attached drawings, wherein below:

FIG. 1 schematically depicts a vehicle system according to one embodiment;

FIG. 2 schematically depicts a vehicle system according to one embodiment;

DETAILED DESCRIPTION

Figure 3:
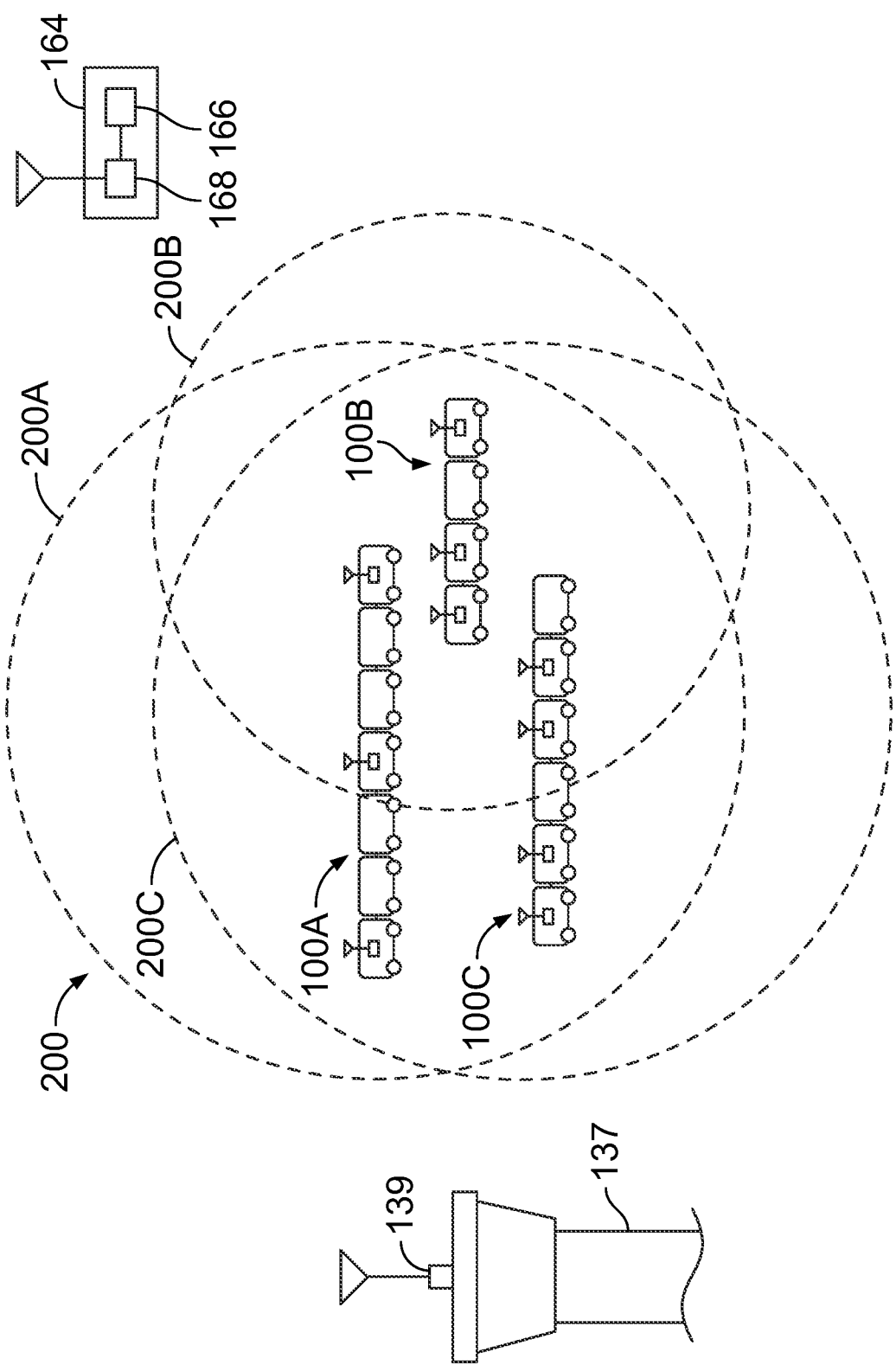
FIG. 3 schematically depicts communication amongst vehicle systems according to one embodiment.

Embodiments of the subject matter described herein relate to a system and method for an electric vehicle. In one instance, a method is provided to monitor and manage the charging of a vehicles with electrical power. The vehicle may be part of a vehicle system. Vehicle systems may be charged with electrical power at a facility that may include a plurality of substations that provide the electrical power to vehicle systems that are in the facility and vehicle systems that are scheduled to arrive at the facility. A control center of the facility may direct vehicle systems that need electrical power to a substation that has the capability to accept electric power from a vehicle (in cases where the vehicle can generate its own power) or to provide electrical power to the vehicle in the form and the amount required by the vehicle. The substations may have different electrical power capabilities and the control center of the facility may communicate with vehicle systems in the facility, vehicle systems arriving to the facility, and vehicle systems departing the facility to determine an appropriate substation for each vehicle system in need of electrical power.

The facility may provide the electrical power to the vehicle systems by being connected to an external utility grid. The facility may include a microgrid. The facility may include renewable energy sources. Renewable energy sources may include solar or wind electrical power generating systems. The facility may include stationary power generators. The facility may include one or more type of energy storage system. The electrical storage system may store electrical power. The power may come from, for example, the utility grid, the microgrid, the renewable sources, or from vehicles electrically coupled to the facility. The facility may include portable electric charging equipment to supplement the electric power available at the substations. The facility may accept loads at the substations in the form of a need for electric power transfer. In one embodiment, the substation may accept electric power from the vehicle system. The accepted electric power may be used to service other loads. The substation may operate to reduce peak demand, to reduce overall system load, to maintain an operating margin for electrical equipment, and the like.

The control center of the facility may communicate with the vehicle to determine (and match) a vehicle need with available vehicle supply. Vehicle needs may include, for example, a required amount of electrical power, certain connection types, factors that relate to the onboard energy storage (age, capacity, charging rates, etc.), and the like. In particular, the determination may include determining a state of charge of the energy storage system onboard the vehicle system. Other factors may include an available amount of time for providing electric power to the vehicle system (that is, what is the desired departure time for the vehicle), a priority of receiving electric power for the vehicle system (for example a contractual determination or a cargo type), a price of electric power that may be determined according to a time of day, a peak power price, a level loading electric power transfer, or a total power requirement. The control center may include sensors that monitor the transfer of electric power. This may be done by monitoring, for example, electric current or temperatures of electric power transfer components such as cables. Other sensors may include thermal imaging, magnetic sensors, optical sensors, and the like.

Substations of the facility may be connected to each other to facilitate the transfer of electric power to vehicle systems from the utility grid, the microgrid, the renewable sources, or the onsite energy generation and/or storage system. The connected substations may allow a vehicle system to transmit or receive electric power from one or more other vehicle systems at one or more connected substations. A vehicle system that is not equipped to receive electric power from the substations of the facility may still receive electric power from another vehicle system(s) at a connected substation(s) through the connection, for example a DC bus.

The control center may monitor the electric power transfer to bill the owners or operators of the vehicle systems that receive electric power at the facility. The control center may monitor the electric power transfer to determine the efficiency of the electric power transfer to the vehicle systems. The control center may monitor the electric power transfer to control the flow of electric power to the vehicle systems based on the power requirement of the vehicle system, the vehicle system's available time to receive electric power, the vehicle system's priority to receive electric power, and/or the price of the electric power. Based on these factors, the control center determines a substation that can provide electric power to the vehicle system.

While one or more embodiments are described in connection with a rail vehicle system, not all embodiments relate to rail vehicle systems. Further, embodiments described herein extend to multiple types of vehicle systems. Suitable vehicle systems may include a rail vehicle, automobile, truck (with or without trailers), bus, marine vessel, aircraft, mining vehicle, agricultural vehicle, and off-highway vehicle. Suitable vehicle systems described herein can be formed from a single vehicle. In other embodiments, the vehicle system may include multiple vehicles that move in a coordinated fashion. With respect to multi-vehicle systems, the vehicles can be mechanically coupled with each other (e.g., by couplers), or they may be virtually or logically coupled but not mechanically coupled. For example, vehicles may be communicatively but not mechanically coupled when the separate vehicles communicate with each other to coordinate movements of the vehicles with each other so that the vehicles travel together (e.g., as a convoy, platoon, swarm, fleet, and the like). A suitable vehicle system may be a rail vehicle system that travels on tracks, or a vehicle system that travels on roads or paths.

Referring FIG. 1, a vehicle system 100 having one or more propulsion-generating vehicles 106 (e.g., vehicles 106A-C) and non-propulsion-generating vehicles 108 (e.g., vehicles 108A-B). One of more of the propulsion-generating vehicles may include a controller 102. The propulsion-generating vehicles and the non-propulsion-generating vehicles may be mechanically coupled together by couplers 110 while the vehicle system moves along a route 104. While the description of the vehicle system with reference to FIG. 1 relates to a vehicle consist, such as a rail vehicle consist having locomotives as the propulsion-generating vehicles and railcars as the non-propulsion-generating vehicles, alternatively, one or more embodiments described herein may be applied to other types of vehicle systems and/or vehicles, such as other off-highway vehicles (e.g., mining vehicles or other vehicles that may be not designed or legally permitted for travel on public roadways), marine vessels, automobiles, trucks, aircraft, or the like. Additionally, the vehicle system may be formed from a single vehicle instead of multiple vehicles. Optionally, in a vehicle system formed from several vehicles, the vehicles may be separate from each other but logically coupled with each other in that the vehicles communicate with each other to coordinate their movements with each other (so that the separate vehicles move together as a larger vehicle system, or convoy, along the routes).

The propulsion-generating vehicles each include a propulsion system 112. Each propulsion system may have traction motors operably coupled with axles 114 and/or wheels 116 of the propulsion-generating vehicles. The traction motors may be connected with the axles and/or wheels via one or more gears, gear sets, or other mechanical devices to transform rotary motion generated by the traction motors into rotation of the axles and/or wheels to propel the vehicles and, consequently, the vehicle system. Different traction motors may be operably connected with different axles and/or wheels such that traction motors that may be deactivated (e.g., turned off) do not rotate corresponding axles and/or wheels while traction motors that remain activated (e.g., turned on) rotate corresponding axles and/or wheels.

Referring to FIG. 2, the vehicle system may include a communication system 118. The communication system may include communication devices 120 (e.g., communication devices 120A-D) disposed onboard the propulsion-generating vehicles. The communication devices represent hardware circuitry that may include and/or is connected with one or more processors (e.g., one or more microprocessors, one or more field programmable gate arrays, one or more integrated circuits, and/or the like) that perform the operations described herein in connection with the communication devices. The communication devices can include or represent transceiving circuitry such as modems, routers, antennas, switches, and the like. The communication devices can run one or more software applications that direct the operations of the processors and/or transceiving circuitry. The communication devices send and/or receive data signals or messages between the communication devices. One or more other pieces of equipment onboard the vehicles of the vehicle system can communicate data with each other via the communication devices.

The communication devices communicate with each other to coordinate operations of the vehicles of the vehicle system with each other. The communication devices may be wired to each other, or communicate wirelessly with each other, or may be manually configured in an open circuit manner. In one embodiment, one of the communication devices is a lead communication device onboard a lead propulsion-generating vehicle 106A of the vehicle system. The remaining communication devices may be remote communication devices onboard corresponding remote propulsion-generating vehicles 106B-106D. The lead propulsion-generating vehicle can remotely control movements of the remote propulsion-generating vehicles by wirelessly sending messages to the remote communication devices of the remote propulsion-generating vehicles. While the lead propulsion-generating vehicle is shown in FIG. 2 at one end of the vehicle system, the lead vehicle need not be located at either end of the vehicle system or be located ahead of the remote propulsion-generating vehicles along a direction of travel of the vehicle system.

In operation, the communication devices on the same vehicle system communicate with each other within timed constraints dictated by a messaging cycle. The messaging cycle defines a schedule that dictates when different communication devices are allowed to communicate (e.g., send and/or receive wireless signals). The messaging cycle can prevent multiple, different communication devices onboard different vehicle systems from wirelessly communicating messages at the same time, which can result in messages not being received due to wireless interference between the competing vehicle systems.

Referring to FIG. 3, multiple vehicle systems 100A, 100B, 100C may be within wireless range of each other. Each communication system of each vehicle system has a wireless range 200. As shown, the wireless ranges 200A, 200B, 200C of different communication systems overlap each other. If these communication systems use the same channel for sending wireless signals, then the wireless signals communicated between vehicles in one vehicle system can interfere with the wireless signals communicated between vehicles in another vehicle system. Because these signals may include directions for changes in how the vehicles in the vehicle systems move (e.g., throttle setting changes and/or brake setting changes), interference with successful communication of the signals can pose a significant threat to safe operation of the vehicle systems. To prevent or reduce the likelihood of this interference, the communication systems use defined messaging cycles to restrict when the different vehicle systems 100A, 100B, 100C are permitted to communicate.

The communication devices of the vehicle systems may communicate with one or more other offboard equipment sets. For example, a control tower 137 of a control center may have a transceiver 139 to communicate with the communication devices of the vehicle systems. An offboard repeater(s) 164 may have a processor(s) 166 and a transceiver 168 to receive and repeat communications from the control tower, the vehicle systems, or communication devices of the vehicles of the vehicle systems. The offboard repeater may repeat signals from the control tower to one or more vehicle systems or from one vehicle system to one or more other vehicle systems, or from one vehicle of a vehicle system to one or more other vehicles of the same vehicle system. Suitable offboard equipment sets may include, for example, cellular towers, Wi-Fi, wide area network (WAN) and Bluetooth enabled devices, communication satellites (e.g., low Earth orbiting or "LEO" satellites), other vehicles, and the like. These communication devices may then relay information to other vehicles or to a back-office location. The information that is communicated may be instantaneously, nearly instantaneously, or periodically. Periodic communications may take the form of "when available" uploads, for data storage devices that upload to a data repository when a communication pathway is opened to them. The communication devices may communicate information by manual uploads where the upload is accomplished by downloading the information to a USB drive or a computing device (smart phone, laptop, tablet, and the like), and from that device communicating the information to a repository.

Figure 4:
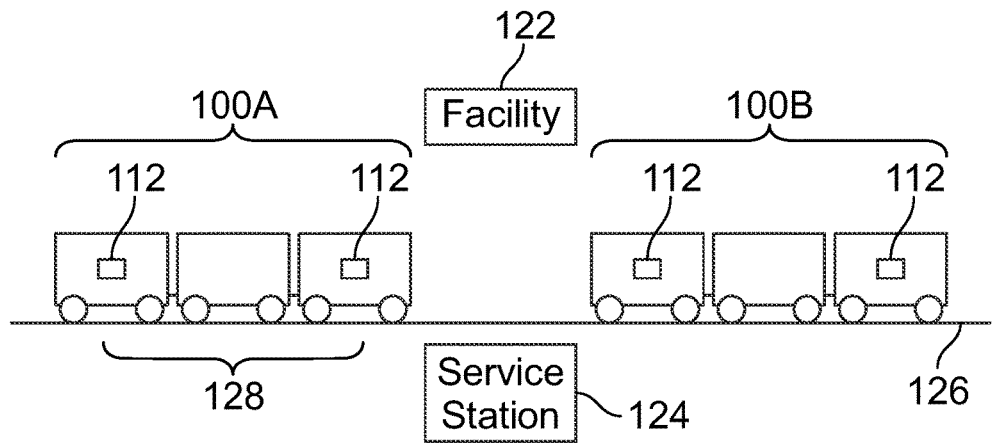
FIG. 4 schematically depicts a plurality of vehicle systems in a system for charging vehicle systems according to one embodiment.

Referring to FIG. 4, a plurality of vehicles systems may be at a facility 122. The facility may be any space where vehicle systems are brought for charging, fueling, loading, unloading, and/or configuring of vehicles, for example in the case of multi-vehicle vehicle systems. According to an example, the vehicle systems may be rail vehicles and the facility may be a rail yard where the rail vehicles are unloaded and/or unloaded. The rail vehicles may be charged and fueled. The rail vehicles may be configured for a new trip by, for example, adding or removing propulsion-generating and/or non-propulsion-generating vehicles to the vehicle system. According to an example, the facility may be a truck stop or a distribution facility where trucks may be unloaded and/or loaded, fueled, and/or connected to one or more trailers.

The vehicle systems may enter the facility along a designated route 126 to a service area 128. According to an example, the designated route may be a track for a rail vehicle. According to an example, the designated route may be lanes that are drawn on a surface of a truck stop lot to direct trucks to various service areas. At the services area, the vehicle system may be serviced from a service station 124. According to an example, the service station may be a energy transfer substation that provides a charge to batteries of the vehicle system. According to an example, the service station may be a fuel station that provides fuel. Suitable fuels may include liquid fuels or gaseous fuels. Liquid fuels may include gasoline, kerosene, alcohols, or diesel. Gaseous fuels may include ammonia or hydrogen. Suitable diesels may include regular diesel, biodiesel, and hydrogenation derived diesel (HRD).

Figure 5:
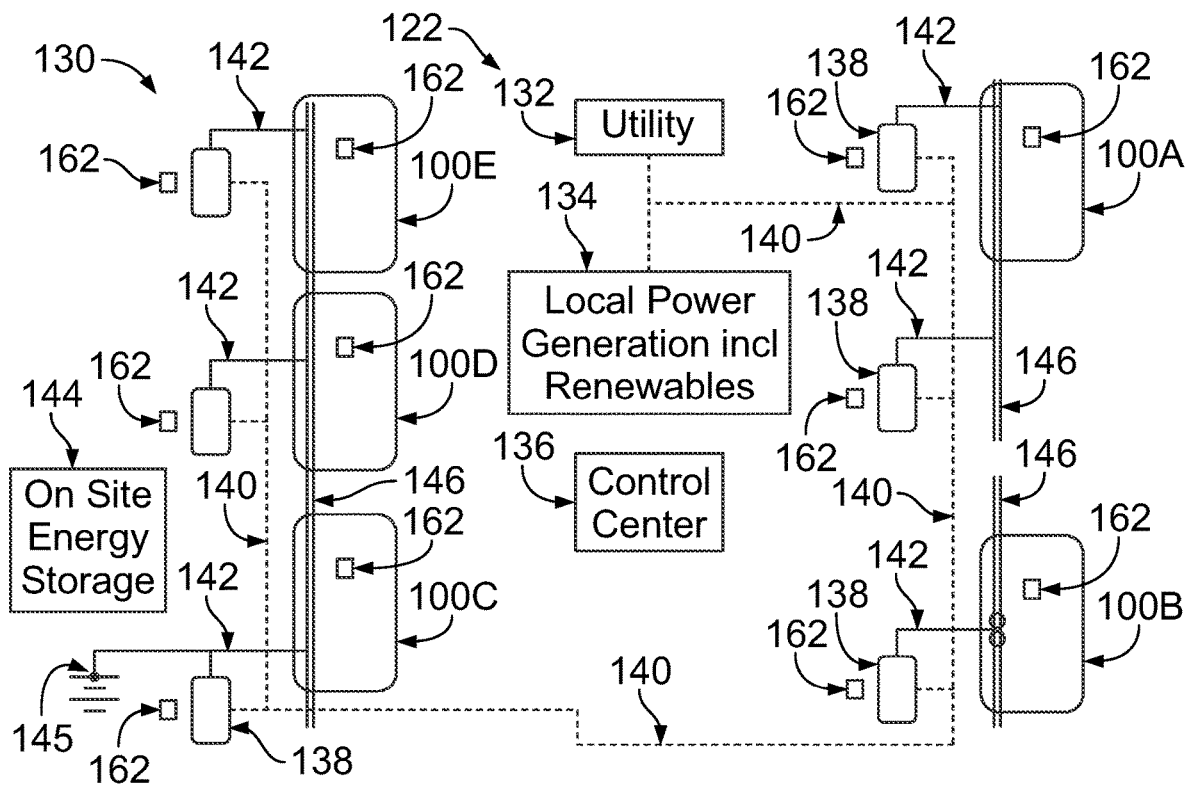
FIG. 5 schematically depicts a system for charging a plurality of vehicle systems according to one embodiment.

Referring to FIG. 5, a system 130 for managing operation of the facility may include or be couple to a utility 132. The utility may be a power grid that is connected to a remote power generating source. The system 130 may include a local electric power generator 134. The local electric power generator may be connected to the utility to supplement the power provided by the utility. The local electric power generator may generate power by, for example gas or steam turbines, fuel cells, and/or by renewable sources such as hydroelectric, thermal, solar panels or wind turbines. The local electric power generator may be, for example, a microgrid. The microgrid may be connected to and operate synchronously with a macrogrid of the utility but may be disconnected from the macrogrid of the utility to operate autonomously or independently of the utility as technical or economic or environmental conditions may require.

The facility may include on or more on-site energy storage devices 144 to store energy from the utility and/or from the local electric power generator. The one or more on-site energy storage devices may be, for example, battery storage systems. The one or more on-site energy storage devices may provide power to the service stations through a terminal(s) 145 in the event the power demand from the vehicle systems in the facility exceeds the power available from the utility and/or the local electric power generator and/or the onsite energy storage device. The total power available may be affected by the cost of available power and the cost as a function of the time. For example, the total available power may be affected by the time of day, the cost of power at the peak of power demand, and/or the availability of power from renewable sources.

The system may include the control center 136 that communicates with the vehicle systems in the facility and with vehicle systems outside the facility that are traveling to the facility for service. The control center may include communication devices for communicating with the vehicle systems and computers for storing data and controlling operations of the service stations. The control center manages and limits the power draw from the utility, the local electric power generator, and/or the on-site energy storage to provide a required amount of charging to each vehicle system in the facility. The control center may be staffed by personnel to monitor and/or operate the communication devices and the computers.

The system may include energy transfer substations or charging stations 138 for charging vehicle systems that are in service areas of the facility. The energy transfer substations transfer electric energy from the utility, the local electric power generator, and/or the onsite energy storage device(s) to vehicles systems at the energy transfer substations. The energy transfer substations are connected to the utility, the local electric power generator, and/or the on-site energy storage by power lines 140. The energy transfer substations provide electric power to the vehicle systems through electrical connections 142. The energy transfer substations may include portable charging equipment that may be moved throughout the facility, for example to provide emergency electric power. The electrical connections may be, for examples, cables (e.g., a catenary). According to an example, the electrical connections may include cables with respective connectors that are manually or automatically connected to respective charging ports of the vehicles. According to an example, the electrical connections may include a pantograph(s) onboard the vehicle(s) that connects to a catenary or engages with an overhead line(s) that delivers current to the vehicle(s) through the pantograph. According to an example, the vehicle systems may be rail vehicles and the energy transfer substations may provide electric power to the rail vehicles through a third rail of a track that the rail vehicles operate on. According to an example, the energy transfer substations provide electric power to the vehicle systems through wireless power transfer, such as an inductive or capacitive coupling system. The energy transfer substations may transfer power to the vehicle systems unidirectionally, i.e., only from the utility, the local electric power generator, and/or the on-site energy storage to the vehicle systems. The energy transfer substations may operate bidirectionally to provide electric power from the utility, the local electric power generator, and/or the on-site energy storage to one or more vehicle systems and from one or more vehicle systems to the utility, the local electric power generator, the on-site energy storage, and/or other vehicle systems. The level of energy transfer may be constant or may vary depending on the time of day based on the cost of the electric power (for example at times of peak power demand) and the availability of electric power (for example from renewable sources).

The energy transfer substations may have different maximum power transfer capabilities. For example, one or more energy transfer substations may provide a maximum power transfer of 2 MW and one or more energy transfer substations may provide a maximum power transfer of 1 MW. The utility may provide a maximum power transfer to the energy transfer substations of the system. The maximum power transfer of the utility may be increased by the local electric power generator and/or the on-site energy storage. The control center distributes the available power from the utility, the local electric power generator, and/or the on-site energy storage during average demand and peak demand.

Two or more of the energy transfer substations may be connected by an electrical connection 146. The electrical connection may be, for example, a DC bus or a catenary that transfers power from one or more energy transfer substations to one or more vehicle systems in one or more service areas. According to an example, the vehicle systems may be rail vehicles that operate on a track and the electrical connection may be a third rail of the track that transfers power to the vehicle systems. The vehicle systems connected to the electrical connection may transfer power between or amongst each other through the electrical connection.

The system may include sensors 162 that provide information on components of the system, components of the vehicle systems, and ambient conditions. The sensors may be provided throughout the facility including in the energy transfer substations. The sensors may include voltage meters and current (ampere) sensors that provide information on the power transfer between each energy transfer substation and each vehicle system. The sensors may include temperature sensors that provide information on the temperature of components of the facility and the vehicle systems. For example, a temperature sensor may provide information on a temperature of a catenary that transfers power from an energy transfer substation to a vehicle system. The temperature sensors may provide information on the temperatures of batteries of the vehicle systems or the on-site energy storage device(s) of the facility. The system may include temperature sensors that provide ambient temperature readings throughout the facility. The sensors may provide information on other ambient conditions, such as humidity, atmospheric pressure. The sensors may provide information on the temperature of the electrical connections, for example the temperature of cables, electrical connectors to the charging ports or current collectors such as pantographs. The sensors may provide the information to the control center and/or the vehicle systems.

Figure 6:
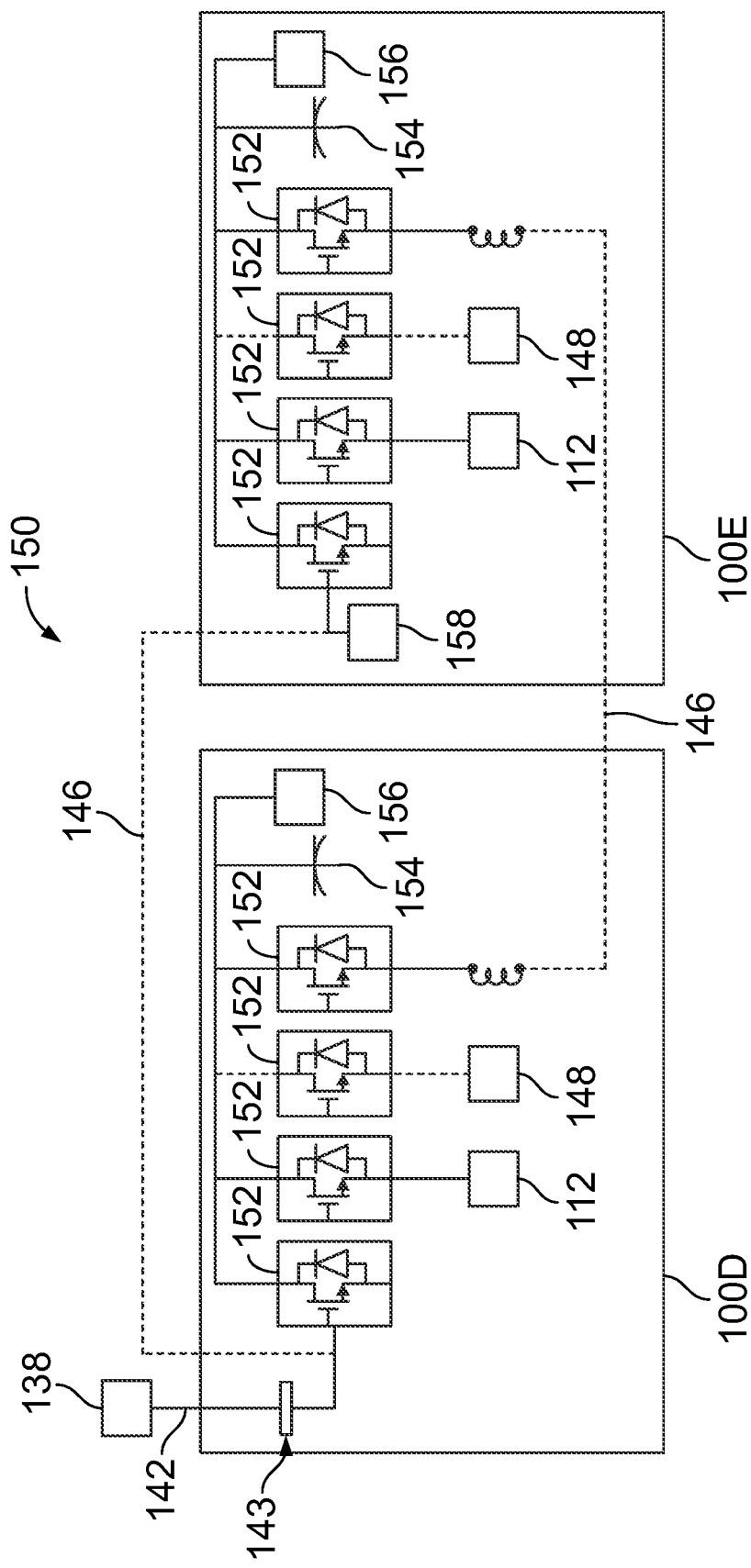
FIG. 6 schematically depicts a system for charging a vehicle system according one embodiment.

Referring to FIG. 6, a system 150 for transferring power between vehicle systems may include a first vehicle system 100D that is connected to an energy transfer substation or a portable charging equipment by a charging connection 143. The charging connection may include a surge protector. The surge protector may be an active surge protector or a passive surge protector. The passive surge protector may include ferrite beads.

The system may include a second vehicle system 100E that may include an onboard electric power generator 158, but it not able to be connected to an energy transfer substation or portable charging equipment. The onboard electric power generator may be, for example, a generator that runs on fuel such as diesel, or a fuel cell(s). According to an example, the first vehicle system is a battery electric locomotive of a rail vehicle. The first vehicle system receives electric power from the energy transfer substation or portable charging equipment. The first vehicle system may receive the electric power in the form of DC power, for example 1000V DC from a power supply, or a variable DC voltage like from a smart charger. The first vehicle system may receive the electric power in the form of AC power. The AC power may be, for example, three-phase alternating current having a voltage of 480 volts and a frequency of 60 Hz. The alternating current is provided through a series of current converters 152 to the propulsion system and one or more auxiliary systems 148. The one or more auxiliary systems may be, for example, air conditioning systems or other systems of the vehicle system that operate on electrical power. The first vehicle system may include one or more filter capacitors 154 to filter out lower frequency current and pass higher frequency current to one or more onboard energy storage devices 156 of the first vehicle system. The one or more onboard energy storage devices may be one or more batteries.

The first vehicle system may provide electric power to the onboard electric power generator of the second vehicle system through an electrical connection. The first vehicle system may include, for example, a head end power generator that generates three-phase alternating current at a fixed voltage and a fixed frequency. The head end power alternator may provide electric power to the onboard electric power generator of the second vehicle system at the same voltage and frequency as the energy transfer substation or portable charging equipment provides to the first vehicle system. Alternately, the head end power generator may provide the electric power at a different frequency and voltage. For example, the charging input may be DC and the head end power may be provided at 480V and 60 Hz. Additionally, the system may include multiple electrical connections (e.g., buses) so that multiple vehicles may exchange electric power through the power line(s).

The first vehicle system may include a transformer or converter or power conditioning equipment to provide electric power to an onboard energy storage device of the second vehicle system through a filter system or converter, which may include an inductor, a capacitor, a DC/DC converter, a DC/AC converter, or an AC/DC converter of the second vehicle system.

The vehicle systems may have different energy storage capacities (e.g., battery storage capacities), charging power capabilities, energy and power requirements, and allowed charging time (for example to meet schedule requirements of the vehicle system). The control center monitors the vehicle systems in the facility and the vehicle systems scheduled to arrive at the facility and manages the facility to assign the vehicle systems to services areas so that the vehicle systems are able to receive the required charging in the allowed time. The control center monitors the existing power transfer capability from the energy transfer substations and between the vehicle systems to limit and manage the power draw from the utility, the local electric power generator, the onsite energy storage device(s), the limitations of the electrical connections (e.g., DC buses), and the vehicle-to-vehicle power transfer capabilities. The control center may consider the cost of the electric power, including the varying cost due to, for example, the time of day, the peak power demand, the availability from renewable sources, etc.

The control center may include information on the service areas of the facility and the capability and/or capacity of equipment in the facility, for example the available electric current from the energy transfer substations. The information may include temporary energy transfer restrictions on the equipment capability. For example, the information may include limits on electric current that may be provided to one or more energy transfer substations from the utility, the local electric power generator, and/or the onsite energy storage device(s) to one or more vehicle systems in the facility.

The control center may receive information from vehicle systems in the facility and vehicle systems scheduled to arrive at the facility that is used to manage the transfer of electric energy between the utility, the local electric power generator, and/or the onsite energy storage device(s) and the vehicle systems. The control center may change one or more energy transfer characteristics based on one or more energy transfer restrictions. For example, the control center may receive information that an onboard energy storage device (e.g., a battery system) of a vehicle system is elevated and may reduce or cease the transfer of electric energy from the energy transfer substation to the vehicle system until the temperature goes below a threshold temperature to prevent damage to the onboard energy storage device. As another example, the control station may monitor the state of charge (SOC) and capacity of the onboard energy storage devices and control the electric energy transfer to one or more vehicle systems to achieve a required SOC and/or capacity for each depending on the capability of each energy transfer substation and within a required time for each vehicle system.

Figure 7:
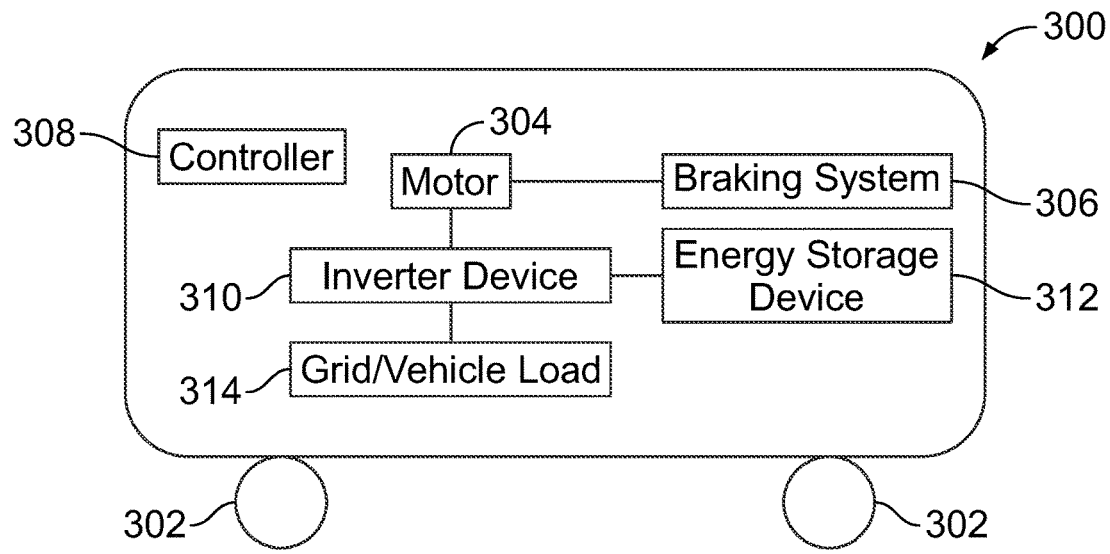
FIG. 7 illustrates a vehicle system in accordance with one embodiment.

FIG. 7 illustrates a vehicle system 300 in accordance with one embodiment. In the illustrated embodiment, the vehicle system may be a single vehicle that includes plural wheels 302 in contact with a route along which the vehicle system moves. The vehicle system may include a controller 308 disposed onboard the vehicle system. The controller may represent a control module, and can include one or more processors, microcontrollers, or other logic-based devices and/or associated software or instructions, for carrying out one or more operations described herein. The controller controls operations of the vehicle system, such as by controlling tractive efforts and/or braking efforts provided by a propulsion system such as a motor 304 (e.g., traction motor, engine, or the like) and braking systems 306. The controller may be manually operated by receiving instruction signals from an input device (not shown) (e.g., a device that receives input from an operator such as, but not limited to, a touchscreen, a joystick, a keyboard, a switch, a wheel, a microphone, or the like) based on manually input from an operator at the input device. An output device (not shown) can provide information to the operator, such as current operational settings of the vehicle system, designated operational settings of a trip plan, a current amount of electric energy stored onboard the vehicle system, a current storage capacity of an onboard energy storage device 312, or the like.

In one or more embodiments, the controller may be automatically operated to autonomously control operations of the vehicle system. For example, a trip plan may be provided by an energy management system (not shown) and/or stored in a tangible and non-transitory computer readable storage medium, or memory (not shown), that is accessible by the controller. The controller and the energy management system may represent two or more control modules in one or more embodiments. The trip plan may designate operational settings of the vehicle system as a function of time or distance along the route for a trip of the vehicle system to a destination location. The designated operational settings of the trip plan may be established in order to reduce one or more of fuel consumed, emissions generated, or time spent in transit by the vehicle system for the trip. The energy management system may include one or more processors, microcontrollers, or other logic-based devices, and/or associated software or instructions, for carrying out one or more operations described herein.

The tractive components operably coupled with the propulsion and/or brake systems (e.g., traction motors, brakes such as air brakes, or the like) may control movement of the wheels (and/or axles joined to the wheels, not shown) of the vehicle system to generate tractive efforts to propel the vehicle system along a route. In addition to providing propulsion force to propel the vehicle system, the propulsion and/or brake systems can act to slow or stop movement of the vehicle system using dynamic braking.

The propulsion and/or brake systems may be electrically powered by electric energy (e.g., electric current) supplied by one or more onboard and/or off-board power sources. For example, the vehicle system may be referred to as hybrid vehicle system such that the vehicle system may be powered by an off-board external power source, an onboard power source, or a combination of the external and onboard power sources. With respect to an onboard power sources, the vehicle system may include the onboard energy storage device and/or a power source (not shown) such as one or more fuel cells, batteries, or the like. The onboard power sources also or alternatively can include one or more onboard energy sources (not shown) that generates electric current onboard the vehicle. For example, the onboard energy source may include a generator and/or alternator that may be connected to the motor by a shaft. Rotation of the shaft by the motor rotates a rotor of the generator to create electric energy (e.g., electric current).

In one or more embodiments, the onboard energy sources may include another type of device that generates or stores electric energy onboard the vehicle, such as one or more solar cells, wind turbines, or the like. In another example, the onboard energy sources may include the traction motors of the propulsion system when the traction motors operate in a dynamic braking mode where electric energy is generated by the traction motors during slowing of the vehicle system. At least some electric energy generated by the dynamic braking can be provided to the onboard energy storage device for storage. Additionally or alternatively, at least some electric energy generated by the dynamic braking can be provided to a system load (e.g., a vehicle load) and/or resistive grid 314. In one or more embodiments, the vehicle load may be an auxiliary load of the vehicle system (e.g., a non-propulsion load such as air-conditioning, coach lighting, passenger power outlet supply, or the like) of the vehicle system and/or other vehicles operably coupled with the vehicle system. Optionally, the vehicle load may be a propulsion load of the vehicle system and/or other vehicles operably coupled with the vehicle system.

While the onboard energy storage device is shown as being disposed onboard the vehicle system and operably coupled with the propulsion and brake systems via an inverter device 310, alternatively, the onboard energy storage device may be disposed onboard another vehicle that is coupled with the vehicle system. For example, the energy storage device may be located on an energy tender vehicle that is connected with the vehicle system by one or more mechanical connections such that movement of the vehicle system also moves the tender vehicle. Such an energy storage device can be connected with the propulsion system of the vehicle system by one or more conductive bodies (e.g., buses, cables, wires, or the like).

The energy storage device can directly supply electric current to the traction motor(s) of the propulsion system to power the motors by being directly coupled with the traction motors (e.g., with no intermediate conductive buses, transformer, or the like, disposed between the energy storage device and the motors). Alternatively or additionally, the energy storage device can indirectly supply the electric current to the traction motors by conveying the current to the motors through one or more conductive buses, transformers, or the like. Optionally, the energy storage device can directly and/or indirectly supply electric current to the inverter device of the vehicle system, to a converter device (not shown), or the like. Also, optionally, the energy storage device may directly and/or indirectly supply electric current to one or more different vehicles operably coupled with (e.g., mechanically and/or logically) the vehicle system to power one or more systems of the different vehicles.

Figure 8:
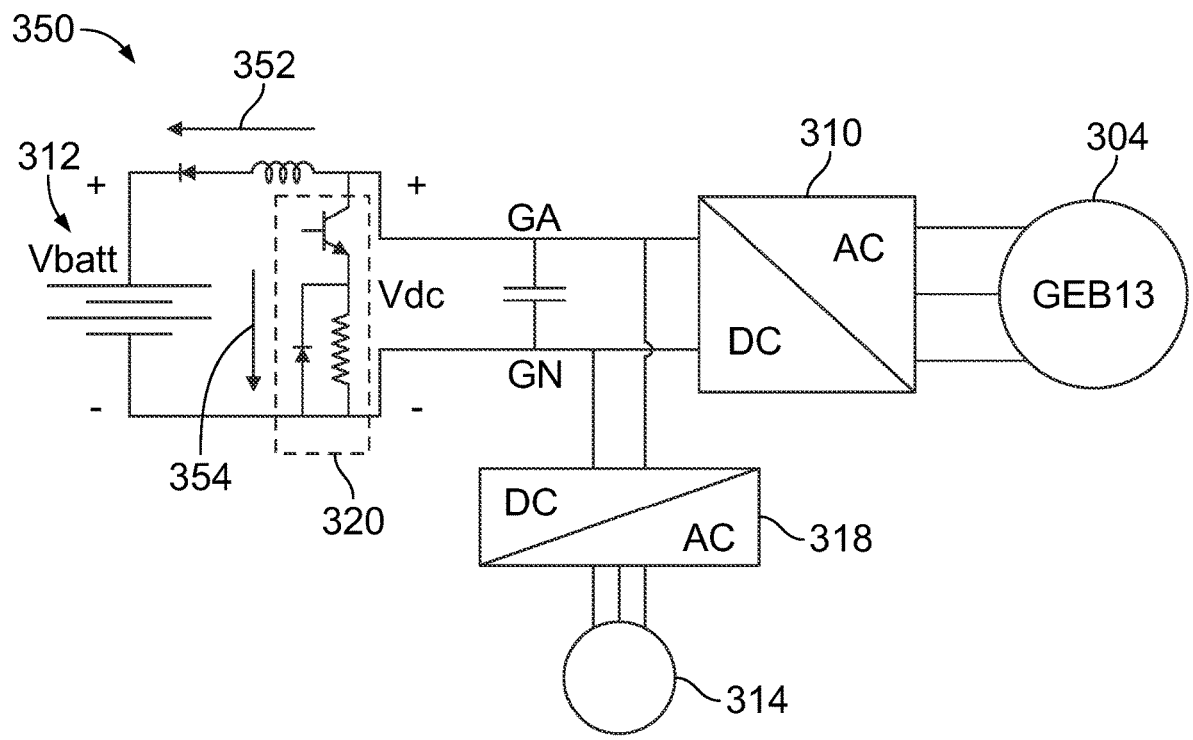
FIG. 8 illustrates a schematic of an electric power system in accordance with one embodiment.

FIG. 8 illustrates a schematic of an electric power system 350 in accordance with one embodiment. The electric power system controls the conduction of electric energy from the motor that is generated by dynamic braking of the vehicle system. In one or more embodiments, some of the electric energy generated by the dynamic braking may in excess of the amount of braking power needed to slow or stop movement of the vehicle system. For example, as the speed of movement of the vehicle system increases, the amount of electric energy needed to brake (e.g., slow or stop) movement of the vehicle system decreases, and the excess electric energy (e.g., braking power) may be directed toward one or more of the onboard energy storage device or the resistive grid or vehicle load of the vehicle system.

The resistive grid may represent a device into which electric energy is dissipated. A portion of electric energy may be directed toward the resistive grid and another portion of electric energy may be directed toward the vehicle load. Optionally, the vehicle system may not include or may be disconnected from a resistive grid, and the electric energy may be directed toward the vehicle load. In one or more embodiments, the portion of electric energy may be directed to plural different vehicle loads (e.g., propulsion and/or non-propulsion loads). Optionally, some electric energy may be directed to one or more different vehicle loads, and some electric energy may be dissipated in the resistive grid.

The electric power system may include the motor (e.g., traction motor) and the inverter device (corresponding to the motor and inverter device shown in FIG. 7). The inverter device receives electric energy from the motor that is generated by dynamic braking of the vehicle system. The electric power system may include the energy storage device, the resistive grid and/or vehicle load, and an auxiliary inverter 318 electrically coupled with the resistive grid and/or vehicle load.

The electric power system may include a variable resistive component 320 that is disposed between the inverter device, the energy storage device, and the resistive grid and/or vehicle load. In one or more embodiments, the variable resistive component may be referred to as a chopper or chopper circuit. The variable resistive component controls a direction of conduction of the electric energy from the inverter device to one or both of the energy storage device or the resistive grid and/or vehicle load. For example, the variable resistive component may direct a first portion 352 of the electric energy toward the energy storage device, and/or may direct a second portion 354 of the electric energy toward the resistive grid and/or vehicle load. The variable resistive component may operate in one or more different modes of operation to control the direction of conduction of the electric energy from the inverter device. The mode of operation of the variable resistive component, and the resulting direction of conduction of the electric energy, may be based on an amount of electric energy from the inverter device, a transfer rate of the electric energy from the inverter device (e.g., a rate at which electric energy is directed from the inverter device), or one or more characteristics of the energy storage device (e.g., a state of charge of the energy storage device, a total amount of energy the energy storage device may hold, a make and/or model of the energy storage device, an age of the energy storage device, a rate at which the energy storage device may receive electric energy, or the like).

In one or more embodiments, the electric power system may include a banking device (not shown) electrically coupled with the energy storage device. The banking device may be a fuel cell, a capacitor bank, or other storage device that may temporarily receive and hold the electric energy directed toward the energy storage device. For example, the banking device may be disposed between the variable resistive component and the energy storage device. The banking device may receive the electric energy from the variable resistive component and may store, hold, maintain, or the like, the electric energy intended for the energy storage device. The banking device may direct at least some electric energy toward the energy storage device responsive to the state of charge of the energy storage device reaching a predetermined threshold. For example, the energy storage device may have a state of charge and/or have an amount of energy that prohibits the receipt of more electric energy. The banking device may temporarily hold or maintain some electric energy until the state of charge of the energy storage device reduces to a predetermined threshold, indicating the energy storage device being capable and/or allowed to receive more electric energy.

Figure 9:
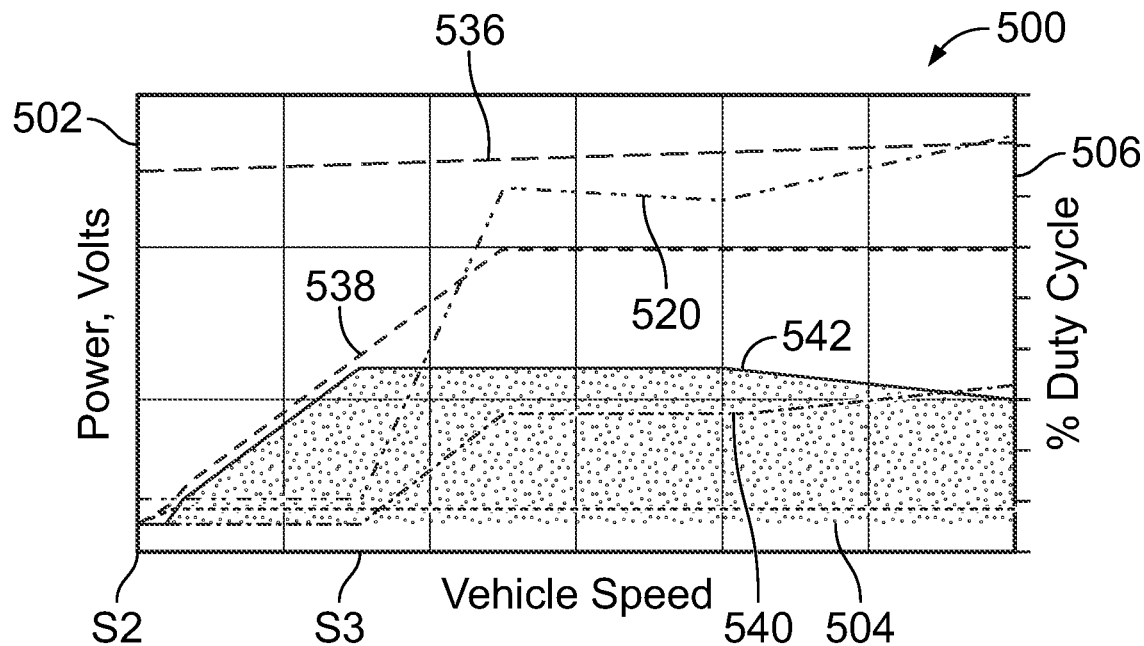
FIG. 9 illustrates a graph of the schematic shown in FIG. 8 in accordance with one embodiment.

FIG. 9 illustrates a graph 500 of the schematic of the electric power system shown in FIG. 8 in accordance with one embodiment. The graph illustrates the distribution of the electric energy between the energy storage device and/or the resistive grid/vehicle load based on one or more operating conditions of the vehicle system. The graph may include a horizontal axis 504 representative of a speed of movement of the locomotive (e.g., miles per hour), a first vertical axis 502 representative of increasing power, and a second vertical axis 506 representative of increasing percentages of a duty cycle of the variable resistive component.

A data line 520 represents a duty cycle of the variable resistive component. The duty cycle may be used to determine the amount of electric energy that is directed toward the resistive grid and/or vehicle load. The controller may calculate the duty cycle of the variable resistive component based on plural factors. First, an estimated power to be dissipated in the resistive grid and/or vehicle load may be based on an amount of power generated by the vehicle system by dynamic braking, a charging current of the energy storage device, and a voltage of the energy storage device. The duty cycle may be based on the estimated power to be dissipated in the grid, the charging current of the energy storage device, the voltage of the energy storage device, a grid resistance, an internal resistance of the energy storage device, and any additional stray resistance of the electric power system.

A data line 536 represents a voltage level of the battery and the voltage of the DC link, where the voltage of the battery is substantially equal to (within 5% of) the voltage of the DC link of the electric power system. A data line 538 represents an electric energy (e.g., brake power) generated by dynamic braking of the vehicle system. A data line 542 represents an amount of electric energy directed toward the energy storage device (e.g., the energy storage device charge power). A data line 540 represents an amount of electric energy directed toward the resistive grid and/or vehicle load of the vehicle system.

The electric power system shown in FIG. 8 prioritizes the energy storage device over the resistive grid and/or vehicle load. For example, the electric power system may direct all the electric energy toward the energy storage device first, and subsequently direct some of the electric energy toward the resistive grid and/or vehicle load responsive to the state of charge of the energy storage device reaching a predetermined threshold. For example, in the illustrated embodiment, from the speed of movement $S_2$ to the speed $S_3$, the variable resistive component operates in a first mode of operation and the electric power system directs all of the electric energy toward the energy storage device. At increasing speeds from the speed $S_3$, the variable resistive component changes operating modes from the first mode of operation to operate in a second mode of operation and the electric power system directs the first portion of the electric energy toward the energy storage device and simultaneously directs the second portion of the electric energy toward the resistive grid and/or vehicle load. The amount of electric energy within the first portion and/or the second portion may be based on one or more factors and/or characteristics of the vehicle system, the energy storage device, the resistive grid and/or vehicle load, or the like.

With regard to the duty cycle, it may determine, or at least be a factor for, the amount of electric energy of the first portion that is directed toward the energy storage device and the amount of electric energy that is directed toward the resistive grid and/or vehicle load. The amount of electric energy of the first portion (e.g., directed toward the energy storage device) may be based on changes to the dynamic braking of the vehicle system (e.g., the amount of power generated by the vehicle system by dynamic braking), a state-of-charge of the energy storage device (e.g., the charging current of the energy storage device), a type or classification of the energy storage device (e.g., one model of an energy storage device may have a charging capacity that is greater than another model of another energy storage device; one model may have a transfer rate of electric energy that the model may receive that is different than a transfer rate of another model of an energy storage device, or the like), or the like. In one or more embodiments, the total amount and/or the transfer rate of the energy storage device may be based on the state-of-charge of the energy storage device, and the state-of-charge of the energy storage device may change during operation of the vehicle system. For example, the state-of-charge may decrease (e.g., the amount of current stored within the energy storage device) as some of the current stored within the energy storage device is used within one or more systems (propulsion and/or non-propulsion systems) of the vehicle system.

In one embodiment, the controller may determine and/or calculate the amount of electric energy that is directed toward the resistive grid and/or vehicle load based on the following equation:

$$P_g = P_{brake} - P_b (\text{if } P_{brake} > P_b)\qquad\text{Eq. 1}$$

In equation 1, $P_g$ represents the resistive grid power, $P_{brake}$ represents the total electric energy (e.g., braking power) indicated by data line 538, and $P_b$ represents the energy storage device (e.g., battery) power. Equation 1 may be used to determine an amount of electric energy that is directed to the resistive grid and/or vehicle load of the vehicle system when the acceptable capacity of the energy storage device (e.g., $P_b$) is less than the brake power ($P_{brake}$). For example, the energy storage device may be able to contain or withhold a predetermined amount of electric energy used to power one or more systems onboard the vehicle system (e.g., propulsion systems and/or non-propulsion systems, or the like).

Alternatively, the controller may change the mode of operation of the variable resistive component to change the direction of conduction, or the amount of electric energy directed to one or both of the energy storage device or the resistive grid and/or vehicle load based on the total amount of electric energy the variable resistive component receives from the inverter device, and the total amount of electric energy changing responsive to changes in the dynamic braking of the vehicle system. For example, if the total amount of electric energy is less than the acceptable capacity of the energy storage device, the amount of electric energy directed toward the resistive grid and/or vehicle load may be based on the following equation:

$$P_g = D * V_{batt}^2 / R_{grid} (\text{if } P_{brake} < P_b)\qquad\text{Eq. 2}$$

In equation 2, D represents the duty cycle of the variable resistive component (e.g., the chopper of the electric power system), $V_{batt}$ represents the voltage of the energy storage device, and $R_{grid}$ represents a resistance of the resistive grid and/or vehicle load. The electric power system shown in FIG. 8 prioritizes directing electric energy toward the energy storage device, and secondarily directs some of the electric energy toward the resistive grid and/or vehicle load of the vehicle system. Additionally, as the duty cycle percentage increases (e.g., at increasing speeds of movement of the vehicle system) the amount or portion of electric energy directed toward the resistive grid and/or vehicle load increases. For example, the amount of electric energy directed toward the resistive grid and/or the vehicle load may change responsive to the amount of electric energy directed toward the energy storage device changing.

In one or more embodiments, the controller of the vehicle system may monitor the total amount of electric energy generated by dynamic braking of the vehicle system and/or the state-of-charge of the energy storage device. Optionally, the controller may automatically (e.g., without operator input) control operation of the variable resistive component to change operating modes of the variable resistive component. Changing operating modes of the variable resistive component changes the direction of conduction of the electric energy, changes the amount of electric energy directed toward the energy storage device, and/or changes the amount of electric energy directed toward the resistive grid and/or vehicle load of the vehicle system.

In one embodiment, the controller may control operation of the variable resistive component to operate in a first mode of operation to direct all of the electric energy toward the energy storage device. In another embodiment, the controller may control operation of the variable resistive component to operate in a second mode of operation to direct at least some electric energy toward the energy storage device and at least some electric energy toward one or both of the resistive grid or the vehicle load. The amount of electric energy directed toward the energy storage device while the variable resistive component operates in the second mode of operation may change based on the state of charge of the energy storage device, the amount of electric energy from the inverter device, or the like. In another embodiment, the controller may control operation of the variable resistive component to operate in a third mode of operation to direct all of the electric energy toward the resistive grid or the vehicle load, or direct some electric energy toward the resistive grid and direct some electric energy toward the vehicle load.

The controller may change the operating mode of the variable resistive component responsive to the total amount of electric energy changing, exceeding a predetermined threshold, or dropping below a predetermined lower limit threshold. Optionally, the controller may indicate to an operator of the vehicle system (e.g., onboard and/or offboard the vehicle system) that the mode of operation of the variable resistive component needs to be changed. Optionally, the controller may direct the operator how to manually change the mode of operation of the variable resistive component.

Figure 10:
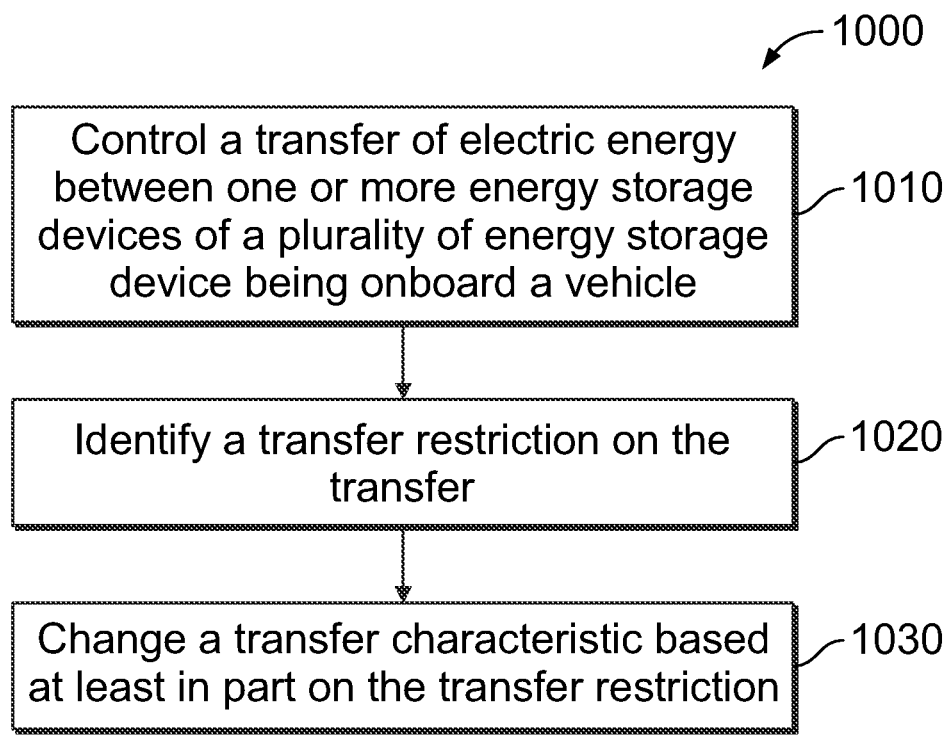
FIG. 10 schematically depicts a method according to one embodiment.

Referring to FIG. 10, a method 1000 includes a step 1010 of controlling a transfer of electric energy between two or more energy storage devices of a plurality of energy storage devices, at least one energy storage device being disposed onboard a vehicle system. The method includes a step 1020 of identify a transfer restriction on the transfer and a step 1030 of changing a transfer characteristic based at least in part on the transfer restriction.

Figure 11:
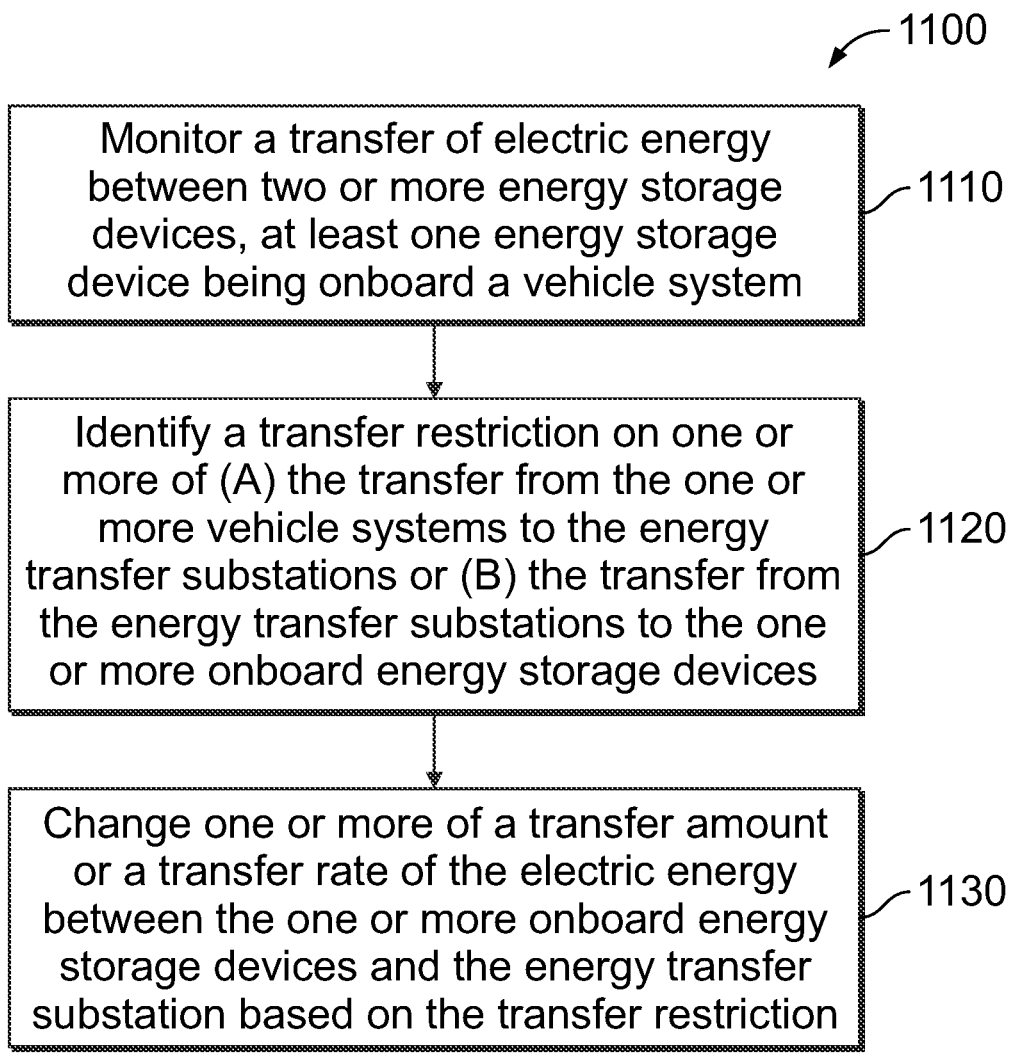
FIG. 11 schematically depicts a method according to one embodiment.

Referring to FIG. 11, a method 1100 includes a step 1110 of monitoring a transfer of electric energy between one or more first energy storage devices disposed onboard one or more first vehicle systems and one or more second energy storage devices onboard one or more second vehicle systems and/or energy transfer substations that are offboard the one or more vehicles systems. According to an example, a transfer of electric energy between a first vehicle having an onboard power generator, such as a diesel locomotive or a vehicle having a fuel cell system, and a second vehicle having an onboard energy storage device, such as a battery electric locomotive, is monitored. The method includes a step 1120 of identifying a transfer restriction on one or more of (a) the transfer of the electric energy from the one or more first vehicle systems to the second vehicle systems and/or the energy transfer substations or (b) the transfer of the electric energy from the energy transfer substations to the one or more first and/or second energy storage devices onboard the one or more first and/or second vehicle systems. The method includes a step 1130 of changing one or more of a transfer amount or a transfer rate of the electric energy between the one or more first and/or second energy storage devices onboard the one or more first and/or second vehicle systems and the energy transfer substations based on the transfer restriction. The energy transfer rate may be based on, for example, the availability, cost, and expected demand of the electric power. The energy transfer rate may depend on a priority of the vehicle systems determined by, for example, scheduling and/or contractual provisions.

There may be a number of restrictions on the transfer of electric energy from the energy transfer substations to the vehicle systems. The transfer of the electric energy may be restricted by, for example, limits due to cables or conductive pathway limitations. The limits on the wires, cables, and/or power lines that restrict how much energy is transferred between vehicles or between the vehicle(s) and the grid(s) can include a positive temperature coefficient (PTC) material along the conductive pathways between the vehicles and/or between the grid(s) and the vehicles. This PTC material can have a resistance or resistivity that changes with temperature. For example, the material can have an increasing resistance to electric current as the temperature of the material increases. This can reduce, limit, or otherwise control the conduction of current when the temperature of the material and/or ambient environment is elevated.

The transfer of the electric energy may be restricted by, for example, the age or capacity of the energy storage devices, both onboard and offboard the vehicle systems. The age or capacity of the energy transfer substations may act as a restriction on the transfer of the electric energy. Environmental factors, such as temperature and/or humidity, may restrict the transfer of the electric energy. The demand on one or more other vehicle systems for electric energy may restrict the electric energy transfer to a vehicle system or other vehicle systems. The facility may include one or more energy transfer substations that can only transfer, but not receive, electric energy to the one or more vehicle systems.

The transfer of electric energy to any vehicle system may be restricted by prioritizing the transfers. For example, the vehicles systems may receive a transfer of electric energy by a first in, first out (FIFO) schedule. As another example, one or more of the vehicle systems may receive the transfer of electric energy under a contracted delivery time or by the type of classification of the vehicle system. For example, passenger vehicle systems may receive the transfer of electric energy before cargo vehicle systems. The vehicle systems may have designations or classifications which include, for example, standard or premium as an indication of when and/or how the vehicle system receives the transfer of electric energy. The control center may prioritize the transfer or electric energy among different vehicle systems in the facility based on several factors. These factors may include, for example, waiting time, delivery time, type of cargo, and/or upcoming trip details. The vehicle systems may communicate the transfer restrictions (e.g., using TRIP OPTIMIZER (TO) system (commercially available from Wabtec Corporation) or Distributed Power (DP) (LocoTROL DP is commercially available from Wabtec Corporation) or Consist Manager (CM) (CONSIST MANAGER system is commercially available from Wabtec Corporation). The vehicle systems may use a Positive Vehicle Control system (e.g., Positive Train Control (PTC) commercially available is I-ETMS from Wabtec Corporation) to communicate the transfer restrictions. The vehicles may communicate with the use of onboard and/or offboard communications systems. The communications may be between vehicles, between wayside devices and vehicles, and vehicles and a back-office system.

The control center may communicate with one or more vehicle systems scheduled to arrive at the facility to determine the charging needs of the one or more vehicle systems. The control center may calculate the demand from the arriving one or more vehicle systems due to, for example, the size of the one or more vehicle systems, cargo being carried, upcoming terrain that the one or more vehicle systems will travel over. The control center may determine or calculate the demand for energy from arriving vehicles based on, for example, vehicle priorities, cargo amounts and/or weights, upcoming trip details (grades, curves, scheduled arrival times, etc.) of the one or more vehicles systems in the facility and/or scheduled to arrive at the facility. If the control center determines or calculates that an upcoming demand is very large, the control center may store energy at an energy transfer substation from a low priority vehicle system that is already in the facility for an incoming vehicle system that has a high demand. The control center may communicate with vehicle system arriving at the facility any restrictions that may be on the transfer of electric power upon arrival and the arriving vehicles may change their operation to manage their energy use based on the restrictions. The control center may communicate to vehicle systems in the facility any restrictions that may be on the transfer of electric power to allow the vehicle systems to manage their charge requirements prior to departure from the facility.

The control center may determine and/or calculate a cost or price of each source of energy. The cost or price may a including time varying nature. For example, the control center may determine or calculate that the cost or price of each source of energy varies depending on a peak power demand and/or the availability of energy from other sources, such as renewable energy available during the transfer(s) of electric energy. The control center may bill or debit the accounts of the owners and/or operators of the vehicle systems that receive transfers of electric energy in the facility.

The cost or price of the energy may be communicated to vehicle systems scheduled to arrive and the vehicle systems scheduled to arrive may make changes to their operation to account for the price or cost. For example, one or more vehicle systems may change the amount of energy provided to the propulsion systems or auxiliary systems to arrive at the facility with their onboard energy storage devices (e.g., battery systems) at a higher state of charge so as to reduce the amount of energy needed at the facility.

According to one example, a vehicle system including a single vehicle enters a service area of the facility having an energy transfer substation and the control center (a) controls the transfer of electric energy to the vehicle system based on an age and/or a capacity of the energy transfer substation and/or the electric connection of the substation (e.g., cables), (b) controls the transfer of electric energy based on an age and/or capacity of the onboard energy storage device of the vehicle system, (c) controls the transfer of electric energy to the vehicle system based on a cost and/or price of the electric energy, and/or (d) transfers electric energy back to the utility, the local electric power generator, and/or onsite energy storage device based on the age and/or capacity of the energy transfer substation and/or the electric connection of the substation, the age and/or capacity of the onboard energy storage device(s) of the vehicle system(s), and/or the price and/or cost of the electric energy.

According to one example, a vehicle system including a single vehicle enters the facility and a plurality of other vehicle systems are in the facility. The control center may operate according to (a)-(d) as described above. Additionally, the single vehicle system may transfer electric energy to any of the plurality of vehicle systems according to (a)-(d) as described above.

According to one example, a vehicle system including multiple vehicles enters the facility including the energy transfer substations. The control center may operate according to (a)-(d) described above. The control center may (e) control transfer of electric energy based on restrictions, age, and/or capacity of the onboard energy storage device of the vehicle system. For example, the onboard electric connection (e.g., cable) may have a higher capacity to transfer electric energy, so less electric energy may be taken from an energy transfer substation electric connection (e.g., cable) connected to a first vehicle of the multi-vehicle system, and more electric energy may be taken from another energy transfer substation electric connection (e.g., cable) connected to a second vehicle of the multi-vehicle system. The transfer may include an onboard electric connection (e.g., cable) that sends some electric energy from the second vehicle to the first vehicle of the multi-vehicle system. The transfer can be carried out to other vehicles in the multi-vehicle system. The control center may (f) control transfer of electric energy from the multi-vehicle system to the utility, the local electric power generator, and/or the onsite energy storage device based on transfer restrictions, age and/or capacity of onboard electric connections (e.g., cables) between onboard energy storage devices (e.g., batteries) in different vehicles of the multi-vehicle system. For example, an onboard cable may have a higher capacity to transfer current, so less current or no current is transferred to the facility using weaker cables between the vehicle system and the facility, and instead stronger and/or higher capacity cables from the vehicle system to the station are used to transfer current from the vehicle system to the facility.

According one example, a multi-vehicle system enters the facility with energy transfer substations and a plurality of other single or multi-vehicle systems in the facility. The control center may operate according to (a)-(f) described above.

According to one example, the movement of an approaching vehicle system may be controlled to increase the amount of energy that is captured and conducted from the vehicle to another vehicle(s) and/or the grid(s). Rather than allowing the vehicle system to coast to a stop at the facility, the vehicle system may approach the facility at faster speeds and dynamically brakes harder (relative to coasting to a stop) to regenerate more energy via dynamic braking. The decision on whether to coast into the facility or to arrive faster and brake harder may be based on the ability of the grid(s) and/or the energy storage devices in the facility to accept the additional energy caused by approaching at faster speeds and dynamically braking harder. The decision of how to approach the facility may be based on whether there is a capacity to unload the power (beyond what the onboard energy storage devices can accept) to a catenary or third rail if the catenary or third rail is available and the vehicle system has an available connection to the catenary or third rail.

A system (e.g., a kit) may be added to non-battery electric vehicles (e.g., battery electric locomotives, or BEL) to offload dynamic braking power obtained during the approach to the facility (to allow vehicles retrofitted with the system or kit to approach faster and dynamically brake harder. These vehicles may only have grids onboard, so efficiency would have these vehicles try to capture 100% of the energy generated through dynamic braking through the added system or kit.

Figure 12:
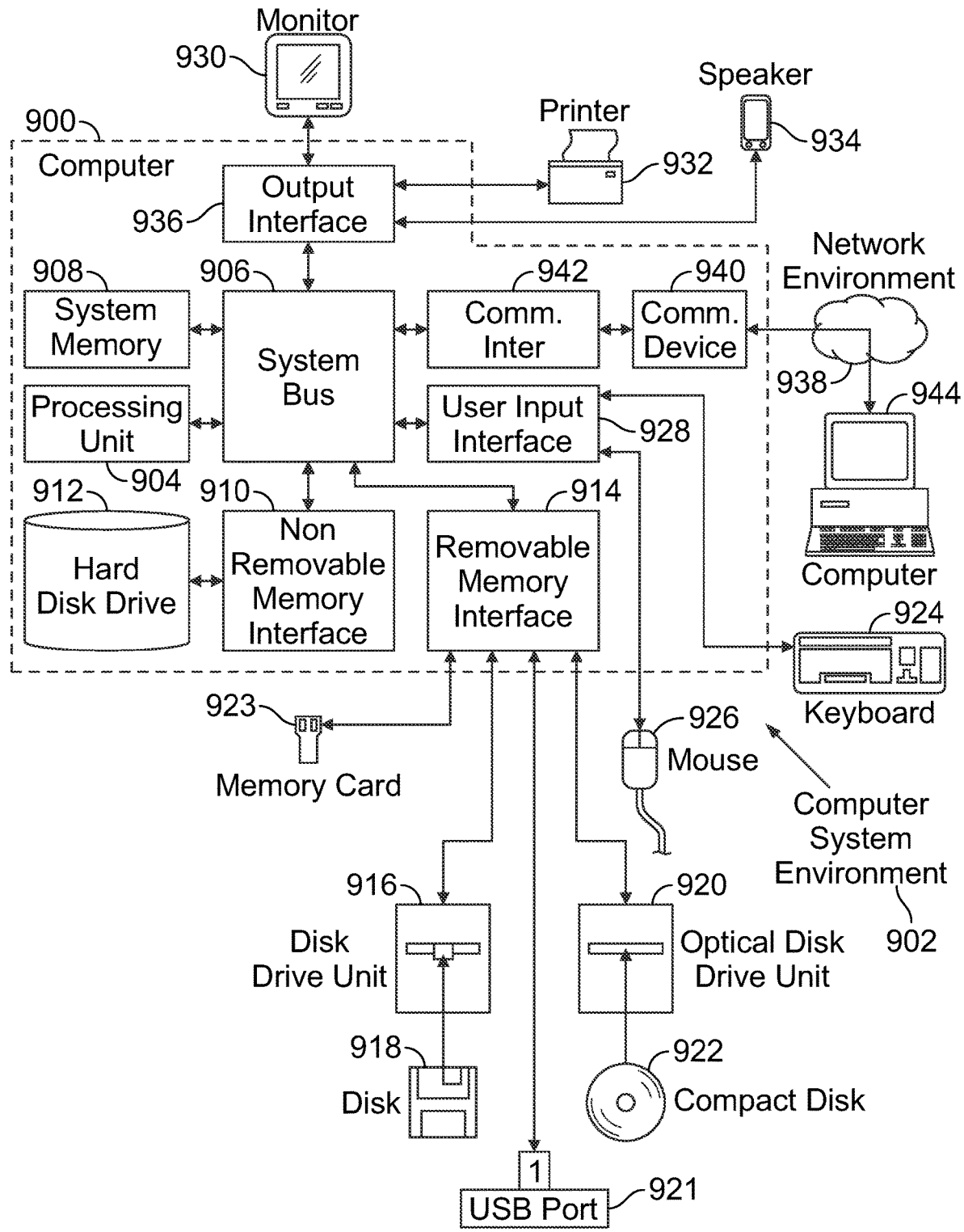
FIG. 12 schematically depicts a computer system according to one embodiment.

Referring to FIG. 12, the control center and the controllers of the vehicle systems may be implemented on a variety of computing devices, servers, processing units, and systems, wherein these computing devices, servers, processing units, and systems include the appropriate processing mechanisms and computer-readable media for storing and executing computer-readable instructions, such as programming instructions, code, and the like. The computing devices, servers, processing units, and systems may be located in different places. For example, a computer(s) onboard a vehicle system may coordinate with an offboard computer(s) or onboard another vehicle system. As shown in FIG. 9, computers 900, 944, in a computing system environment 902 are provided. The computing system environment 902 may include, but is not limited to, at least one computer having components for appropriate operation, execution of code, and creation and communication of data. For example, the computer may include a processing unit 904 (having one or more processors) that may execute computer-based instructions received in the appropriate data form and format. The processing unit may be in the form of one or multiple processors executing code in series, in parallel, or in any other manner for appropriate implementation of the computer-based instructions.

To facilitate appropriate data communication and processing information between the various components of the computer, a system bus 906 is utilized. The system bus may be any of several types of bus structures, including a memory bus or memory controller, a peripheral bus, or a local bus using any of a variety of bus architectures. The system bus may facilitate data and information communication between the various components (whether internal or external to the computer) through a variety of interfaces, as discussed hereinafter.

The computer may include a variety of discrete computer-readable media components. For example, the computer-readable media may include any media that can be accessed by the computer, such as volatile media, non-volatile media, removable media, non-removable media, etc. The computer-readable media may include computer storage media, such as media implemented in any method or technology for storage of information, such as computer-readable instructions, data structures, program modules, or other data, random access memory (RAM), read only memory (ROM), electrically erasable programmable read only memory (EE-PROM), flash memory, or other memory technology, CD-ROM, digital versatile disks (DVDs), or other optical disk storage, magnetic cassettes, magnetic tape, magnetic disk storage, or other magnetic storage devices, or any other medium which can be used to store the desired information and which can be accessed by the computer 900. Further, the computer-readable media may include communications media, such as computer-readable instructions, data structures, program modules, or other data in other transport mechanisms and include any information delivery media, wired media (such as a wired network and a direct-wired connection), and wireless media. Computer-readable media may include all machine-readable media with the possible exception of transitory, propagating signals. Combinations of any of the above are included within the scope of computer-readable media.

The computer may include a system memory 908 with computer storage media in the form of volatile and non-volatile memory, such as ROM and RAM. A basic input/output system (BIOS) with appropriate computer-based routines assists in transferring information between components within the computer and is stored in ROM. The RAM portion of the system memory contains data and program modules that are accessible to or presently being operated on by the processing unit, e.g., an operating system, application programming interfaces, application programs, program modules, program data and other instruction-based computer-readable codes.

The computer may include other removable or non-removable, volatile or non-volatile computer storage media products. For example, the computer may include a non-removable memory interface 910 that communicates with and controls a hard disk drive 912, i.e., a non-removable, non-volatile magnetic medium; and a removable, non-volatile memory interface 914 that communicates with and controls a magnetic disk drive unit 916 (which reads from and writes to a removable, non-volatile magnetic disk 918), an optical disk drive unit 920 (which reads from and writes to a removable, non-volatile optical disk 922, such as a CD ROM), a Universal Serial Bus (USB) port 921 for use in connection with a removable memory card, etc. Other removable or non-removable, volatile or non-volatile computer storage media can be used in the exemplary computing system environment, including, but not limited to, magnetic tape cassettes, DVDs, digital video tape, solid state RAM, solid state ROM, etc. These various removable or non-removable, volatile or non-volatile magnetic media are in communication with the processing unit and other components of the computer via the system bus. The drives and their associated computer storage media provide storage of operating systems, computer-readable instructions, application programs, data structures, program modules, program data and other instruction-based computer-readable code for the computer 900 (whether duplicative or not of this information and data in the system memory).

A user may enter commands, information, and data into the computer through certain attachable or operable input devices, such as a keyboard 924, a mouse 926, etc., via a user input interface 928. The user may be in the control center of the facility. The user may be onboard a vehicle system in the facility or en route to the facility. A variety of input devices may be utilized, e.g., a microphone, a trackball, a joystick, a touchpad, a touch-screen, a scanner, etc., including any arrangement that facilitates the input of data, and information to the computer from an outside source. The input devices are connected to the processing unit through the user input interface coupled to the system bus but may be connected by other interface and bus structures, such as a parallel port, game port, or a universal serial bus (USB). Data and information can be presented or provided to a user in an intelligible form or format through certain output devices, such as a monitor 930 (to visually display this information and data in electronic form), a printer 932 (to physically display this information and data in print form), a speaker 934 (to audibly present this information and data in audible form), etc. All of the output devices are in communication with the computer through an output interface 936 coupled to the system bus. Any of the peripheral output devices may provide information and data to the user.

The computer may operate in a network environment 938 through the use of a communications device 940, which is integral to the computer or remote therefrom. This communications device is operable by and in communication to the other components of the computer through a communications interface 942. Using such an arrangement, the computer may connect with or otherwise communicate with one or more remote computers, such as a remote computer 944. The remote computer may be a personal computer, smart phone, a server, a router, a network personal computer, a peer device, or other common network nodes. Using appropriate communication devices, e.g., a modem, a network interface or adapter, etc., the computer may operate within and communication through a network. Suitable networks may include local area network (LAN) and a wide area network (WAN) but may include other networks such as a virtual private network (VPN), a MESH network, a CAN Bus, and the like selected based on application specific criteria.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

A controller may control a transfer of electric energy between two or more energy storage devices of a plurality of energy storage devices. At least one energy storage device may be disposed onboard a vehicle system. The controller may identify a transfer restriction on the transfer and change a transfer characteristic based at least in part on the transfer restriction.

The transfer restriction may be a voltage limit or a current limit of (A) an electric energy transfer substation that transfers the electric energy to the vehicle system or (B) an electric connection of the electric energy substations to the vehicle system. The transfer restriction may be one or more of a voltage limit or a current limit of the at least one onboard energy storage device. The transfer restriction may be one or more of a voltage availability or a current availability from one or more sources of the electric energy. The transfer restriction may be one or more of a cost or a price of the electric energy. The transfer restriction may be one or more environmental conditions. The transfer restriction may be a priority ranking of the two or more energy storage devices. The transfer characteristic may be one or more of a transfer amount or a transfer rate of the electric energy between the two or more energy storage devices. The first energy storage device may be onboard the vehicle system and a second energy storage device may be offboard the vehicle system. The first energy storage device may be onboard a first vehicle system and a second energy storage device may be onboard a second vehicle system. The transfer of the electric energy between the two or more energy storage devices may be through one or more of a utility macrogrid, a utility microgrid, the vehicle system, or other vehicle systems.

The priority ranking may be based at least in part on prioritization factors. The prioritization factors may include an order that the two or more energy storage devices begin the transfer of electric energy, a schedule that the two or more energy storage devices are to receive the transfer of electric energy, a required charge for each of the two or more energy storage devices, availability of transfer of electric energy during operation of the vehicle system, a predicted electric energy transfer, one or more of a classification of the vehicle system or a cargo of the vehicle system, and/or a classification of an owner or operator of the vehicle system.

The controller may change the transfer restriction based on one or more of a current demand for the transfer of electric energy or an expected demand for transfer of electric energy. The controller may control the transfer of electric energy between multiple vehicles of the vehicle system. The controller may control the transfer of electric energy between multiple vehicle systems. The controller may control the transfer of electric energy between the vehicle system and one or more other vehicle systems electrically connected to the vehicle system. The vehicle system and the one or more other vehicle systems may be electrically connected conductively. The vehicle system and the one or more other vehicle systems may be electrically connected inductively. The transfer restriction may include an available charge of each energy storage device onboard the vehicle system and one or more other vehicle systems.

A system may include a controller to monitor transfer of electric energy between one or more energy storage devices disposed onboard one or more vehicle systems and energy transfer substations that are offboard the one or more vehicle systems. The controller may identify a transfer restriction on one or more of (a) the transfer of the electric energy from the one or more vehicle systems to the energy transfer substations or (b) the transfer of the electric energy from the energy transfer substations to the one or more energy storage devices onboard the one or more vehicle systems. The controller may change one or more of a transfer amount or a transfer rate of the electric energy between the one or more energy storage devices onboard the one or more vehicle systems and the energy transfer substations based on the transfer restriction.

The transfer restriction may include one or more of a voltage limit or a current limit of one or more electrical connections between the energy transfer substations and the one or more energy storage devices onboard the one or more vehicle systems. The transfer restriction may include one or more of a voltage limit or a current limit of the one or more energy storage devices. The transfer restriction may include one or more of a voltage limit or a current limit of the energy transfer substations. The transfer restriction may include one or more environmental conditions. The transfer restriction may include one or more demands for electric energy from the one or more vehicle systems.

The controller may change one or more of the transfer amount or the transfer rate based at least in part on a predicted amount of electric energy transfer from one or more vehicle systems scheduled to arrive at one or more of the energy transfer substations, a priority ranking of the one or more vehicle systems, a schedule that the one or more vehicle systems are to receive the transfer of electric energy, a required charge for the one or more energy storage devices onboard the one or more vehicle systems, availability of transfer of electric energy during operation of the vehicle system, one or more of a a classification of the vehicle system or a cargo of the vehicle system, and/or a classification of an owner or operator of the one or more vehicle systems.

The transfer of the electric energy between the energy transfer substations and the one or more energy storage devices onboard the one or more vehicle systems may be through one or more of a utility macrogrid, a utility microgrid, one or more energy storage devices offboard the one or more vehicle systems, or the one or more vehicle systems. The controller may control the transfer of electric energy between multiple vehicles of the vehicle system. The controller may control the transfer of electric energy between multiple vehicle systems. The system may include one or more energy storage devices that are offboard the one or more vehicles systems and electrically connected to the energy transfer substations.

The controller may control a transfer of electric energy from the one or more vehicle systems to one or more of the energy transfer substations. The controller may control the transfer of electric energy between multiple vehicles of the one or more vehicle systems. The controller may control the transfer of electric energy between multiple vehicle systems. The multiple vehicle systems may be electrically connected conductively. The multiple vehicle systems may be electrically connected inductively. The controller may communicate the transfer restriction between the multiple vehicle systems. The controller may determine one or more of a cost or a price of the transfer of the electric energy.

A method may include controlling a transfer of electric energy between two or more energy storage devices of a plurality of energy storage devices, at least one energy storage device being disposed onboard a vehicle system, and identifying a transfer restriction on the transfer. The method may include changing a transfer characteristic based at least in part on the transfer restriction.

The transfer restriction may include one or more of a voltage limit or a current limit of (A) an electric energy transfer substation that transfers the electric energy to the vehicle system or (B) an electric connection of the electric energy substations to the vehicle system. The transfer restriction may include one or more of a voltage limit or a current limit of the at least one onboard energy storage device. The transfer restriction may include one or more of a voltage availability or a current availability from one or more sources of the electric energy. The transfer restriction may include one or more of a cost or a price of the electric energy. The transfer restriction may include one or more environmental conditions. The transfer restriction may include a priority ranking of the two or more energy storage devices. The transfer characteristic may include one or more of one or more of a transfer amount or a transfer rate of the electric energy between the two or more energy storage devices.

The first energy storage device may be onboard the vehicle system and a second energy storage device may be offboard the vehicle system. The electric energy may be transferred from the first energy storage device to the second energy storage device. The first energy storage device may be onboard a first vehicle system and a second energy storage device may be onboard a second vehicle system. The first energy storage device and/or the second energy storage device may be a fuel cell. The transfer of the electric energy between the two or more energy storage devices may be through one or more of a utility macrogrid, a utility microgrid, the vehicle system, or other vehicle systems. The method may include transferring electric energy from one or more of the energy storage devices to the microgrid.

The method may include determining the priority ranking based at least in part on prioritization factors. The prioritization factors may include an order that the two or more energy storage devices begin the transfer of electric energy, a schedule that the two or more energy storage devices are to receive the transfer of electric energy, a required charge for each of the two or more energy storage devices, availability of transfer of electric energy during operation of the vehicle system, a predicted electric energy transfer, one or more of a classification of the vehicle system or a cargo of the vehicle system, and/or a classification of an owner or operator of the vehicle system.

The electric energy may be alternating current. The method may include converting the alternating current to direct current during the transfer of the electric energy. The method may include changing the transfer restriction based on one or more of a current demand for the transfer of electric energy or an expected demand for transfer of electric energy. The method may include controlling the transfer of electric energy between multiple vehicles of the vehicle system. The method may include controlling the transfer of electric energy between multiple vehicle systems. The method may include communicating the transfer restriction between the multiple vehicle systems. The method may include controlling the transfer of electric energy between the vehicle system and one or more other vehicle systems electrically connected to the vehicle system.

The vehicle system and the one or more other vehicle systems may be electrically connected conductively. The vehicle system and the one or more other vehicle systems may be electrically connected inductively. The transfer restriction may include an available charge of each energy storage device onboard the vehicle system and the one or more other vehicle systems.

A method may include monitoring transfer of electric energy between one or more energy storage devices disposed onboard one or more vehicle systems and energy transfer substations that are offboard the one or more vehicle systems and identifying a transfer restriction on one or more of (a) the transfer of the electric energy from the one or more vehicle systems to the energy transfer substations or (b) the transfer of the electric energy from the energy transfer substations to the one or more energy storage devices onboard the one or more vehicle systems. The method may include changing one or more of a transfer amount or a transfer rate of the electric energy between the one or more energy storage devices onboard the one or more vehicle systems and the energy transfer substations based on the transfer restriction.

The transfer restriction may include one or more of a voltage limit or a current limit of one or more electrical connections between the energy transfer substations and the one or more energy storage devices onboard the one or more vehicle systems. The transfer restriction may include one or more of a voltage limit or a current limit of the one or more energy storage devices. The transfer restriction may include one or more of a voltage limit or a current limit of the energy transfer substations. The transfer restriction may include one or more environmental conditions. The transfer restriction may include one or more demands for electric energy from the one or more vehicle systems.

The method may include changing one or more of the transfer amount or the transfer rate based at least in part on a predicted amount of electric energy transfer from one or more vehicle systems scheduled to arrive at one or more of the energy transfer substations, a priority ranking of the one or more vehicle systems, a schedule that the one or more vehicle systems are to receive the transfer of electric energy, a required charge for the one or more energy storage devices onboard the one or more vehicle systems, availability of transfer of electric energy during operation of the vehicle system, one or more of a classification of the vehicle system or a cargo of the vehicle system, and/or a classification of an owner or operator of the one or more vehicle systems.

The transfer of the electric energy between the energy transfer substations and the one or more energy storage devices onboard the one or more vehicle systems may be through one or more of a utility macrogrid, a utility microgrid, one or more energy storage devices offboard the one or more vehicle systems, or the one or more vehicle systems.

The method may include controlling the transfer of electric energy between multiple vehicles of the vehicle system. The method may include controlling the transfer of electric energy between multiple vehicle systems. The one or more energy storage devices that are offboard the one or more vehicles systems are electrically connected to the energy transfer substations. The method may include controlling a transfer of electric energy from the one or more vehicle systems to one or more of the energy transfer substations. The method may include controlling the transfer of electric energy between multiple vehicles of the one or more vehicle systems. The method may include controlling the transfer of electric energy between multiple vehicle systems. The multiple vehicle systems may be electrically connected conductively. The multiple vehicle systems may be electrically connected inductively. The method may include communicating the transfer restriction between the multiple vehicle systems. The method may include determining one or more of a cost or a price of the transfer of the electric energy.

In one embodiment, the controller may determine how much total energy is available for charging and compare that to the current charging needs of the various equipment in its determined area of control. The controller may prioritize some charging needs higher or lower relative to other charging needs. The controller may allocate a portion of the overall available energy to the equipment based on the prioritized need. The charging power allocation may be bounded on the upper end by implementations of embodiments of the invention. The charging power allocation may be provided on the lower end based on prioritization of the operational needs. For example, equipment that uses power directly (rather than for charging) may be a load on the system and needs the power to operate at all. Thus, if it needs the power to operate, the prioritization is the highest. Equipment with a battery that needs charging power may need a minimum amount of power or may need power in the form of a state of charge that is determined by an upcoming determined use. The battery may have an optimal charge (C-) rate and may have a charging window available that the controller can use to determine how best to charge the battery for that equipment and still meet the need. Embodiments may then inform the controller of additional charging factors other than an upper bound on the charging that is created by an absolute C-rate of the battery. The additional charging factors may include, at least, the capabilities of the charging equipment and the available power for charging.

Where any or all of the terms "comprise", "comprises", "comprised" or "comprising" are used in this specification (including the claims) they are to be interpreted as specifying the presence of the stated features, integers, steps or components, but not precluding the presence of one or more other features, integers, steps or components. The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and clauses, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and clauses, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A controller configured to:
   control a transfer of electric energy between two or more energy storage devices of a plurality of energy storage devices, a first energy storage device of the two or more energy storage devices being disposed onboard a vehicle system comprising multiple vehicles, wherein the first energy storage device is configured to provide at least some of the electric energy to power one or more loads of the multiple vehicles;
   identify a transfer restriction on the transfer, wherein the transfer restriction comprises one or more of a voltage limit or a current limit of (A) an electric energy transfer substation that transfers the electric energy to the vehicle system or (B) an electric connection of electric energy transfer substations to the vehicle system; and
   change a transfer characteristic based at least in part on the transfer restriction, wherein the transfer characteristic comprises a transfer rate of the electric energy between the two or more energy storage devices.

2. The controller of claim 1, wherein the transfer restriction further comprises one or more of:
one or more of a voltage limit or a current limit of the first energy storage device;
one or more of a voltage availability or a current availability from one or more sources of the electric energy;
one or more of a cost or a price of the electric energy;
one or more environmental conditions; or
a priority ranking of the two or more energy storage devices.

3. The controller of claim 2, wherein the controller is configured to determine the priority ranking based at least in part on prioritization factors including:
an order that the two or more energy storage devices are configured to begin the transfer of electric energy;
a schedule that the two or more energy storage devices are configured to receive the transfer of electric energy;
a required charge for each of the two or more energy storage devices;
availability of transfer of electric energy during operation of the vehicle system;
a predicted electric energy transfer;
one or more of a classification of the vehicle system or a cargo of the vehicle system; and
a classification of an owner or operator of the vehicle system.

4. The controller of claim 1, wherein the transfer characteristic comprises the transfer rate of the electric energy between the two or more energy storage devices, and wherein the transfer characteristic further comprises one or more of (a) a transfer amount of the electric energy between the two or more energy storage devices, or (c) an available charge of each energy storage device onboard the vehicle system.

5. The controller of claim 1, wherein a second energy storage device is offboard the vehicle system.

6. The controller of claim 1, wherein the transfer of the electric energy between the two or more energy storage devices is through one or more of a utility macrogrid, a utility microgrid, the vehicle system, or other vehicle systems.

7. The controller of claim 1, wherein the controller is configured to change the transfer characteristic based on one or more of a current demand for the transfer of electric energy or an expected demand for transfer of electric energy.

8. The controller of claim 1, wherein the controller is configured to control the transfer of electric energy between the multiple vehicles of the vehicle system.

9. The controller of claim 1, wherein the controller is configured to control the transfer of electric energy between multiple vehicle systems.

10. The controller of claim 1, wherein the controller is configured to control the transfer of electric energy between the vehicle system and one or more other vehicle systems electrically connected to the vehicle system.

11. A system comprising:
a controller configured to monitor transfer of electric energy between one or more energy storage devices disposed onboard one or more first vehicle systems and energy transfer substations that are offboard the one or more first vehicle systems, the controller configured to:
identify a transfer restriction on the transfer of the electric energy from the energy transfer substations to the one or more energy storage devices onboard the one or more first vehicle systems, wherein the transfer restriction comprises one or more of a voltage limit or a current limit of one or more electric connections of the energy transfer substations to the one or more first vehicle systems;
determine an energy requirement of one or more second vehicle systems, the one or more second vehicle systems comprising one or more energy storage devices configured to receive at least some of the electric energy from the energy transfer substations subsequent to the transfer of the electric energy between the one or more energy storage devices of the one or more first vehicle systems and the energy transfer substations; and
change a transfer rate of the electric energy between the one or more energy storage devices onboard the one or more first vehicle systems and the energy transfer substations based on the transfer restriction and the energy requirement of the one or more second vehicle systems.

12. The system of claim 11, wherein the transfer restriction further comprises one or more of:
one or more of a voltage limit or a current limit of the one or more energy storage devices;
one or more of a voltage limit or a current limit of the energy transfer substations;
one or more environmental conditions; or
one or more demands for electric energy from the one or more first vehicle systems.

13. The system of claim 11, wherein the controller is configured to change the transfer rate of the electric energy between the one or more energy storage devices onboard the one or more first vehicle systems and the energy transfer substations based on the transfer restriction and the energy requirement of the one or more second vehicle systems, and wherein the controller is further configured to change one or more of a transfer amount based at least in part on:
a predicted amount of electric energy transfer from the one or more second vehicle systems scheduled to arrive at one or more of the energy transfer substations;
a priority ranking of the one or more first vehicle systems;
a schedule that the one or more first vehicle systems are to receive the transfer of electric energy;
a required charge for the one or more energy storage devices onboard the one or more first vehicle systems;
availability of transfer of electric energy during operation of at least one of the one or more first vehicle systems;
one or more of a classification of the one or more first vehicle systems or a cargo of the one or more first vehicle systems; or
a classification of an owner or operator of the one or more vehicle systems.

14. The system of claim 11, wherein the transfer of the electric energy between the energy transfer substations and the one or more energy storage devices onboard the one or more first vehicle systems is through one or more of a utility macrogrid, a utility microgrid, one or more energy storage devices offboard the one or more first vehicle systems, or the one or more first vehicle systems.

15. The system of claim 11, further comprising:
one or more energy storage devices that are offboard the one or more first vehicle systems and electrically connected to the energy transfer substations.

16. A method comprising:
controlling a transfer of electric energy between two or more energy storage devices that include a first energy storage device being disposed onboard a first vehicle system, a second energy storage device being disposed offboard the first vehicle system;

identifying a transfer restriction on the transfer, wherein the transfer restriction comprises one or more of a voltage limit or a current limit of (A) an electric energy transfer substation that transfers the electric energy to the first vehicle system or (B) an electric connection of the electric energy transfer substations to the first vehicle system;

determining an energy requirement of a second vehicle system, the second vehicle system comprising a third energy storage device configured to receive at least some of the electric energy from the second energy storage device; and changing a transfer characteristic based at least in part on the transfer restriction and the energy requirement of the second vehicle system, wherein the transfer characteristic comprises a transfer rate of the electric energy between the two or more energy storage devices.

17. The method of claim 16, wherein the transfer restriction comprises one or more of:
one or more of a voltage limit or a current limit of the first energy storage device;
one or more of a voltage availability or a current availability from one or more sources of the electric energy;
one or more of a cost or a price of the electric energy;
one or more environmental conditions; or
a priority ranking of the two or more energy storage devices.

18. The method of claim 16, wherein the transfer characteristic comprises the transfer rate of the electric energy between the two or more energy storage devices, and wherein the transfer characteristic further comprises a transfer amount of the electric energy between the two or more energy storage devices.

19. The method of claim 16, wherein the transfer of the electric energy between the two or more energy storage devices is through one or more of a utility macrogrid, a utility microgrid, the first vehicle system, or other vehicle systems.

20. The method of claim 17, further comprising:
determining the priority ranking based at least in part on prioritization factors including:
an order that the two or more energy storage devices are configured to begin the transfer of electric energy;
a schedule that the two or more energy storage devices are configured to receive the transfer of electric energy;
a required charge for each of the two or more energy storage devices;
availability of transfer of electric energy during operation of the first vehicle system;
a predicted electric energy transfer;
one or more of a classification of the first vehicle system or a cargo of the first vehicle system; and
a classification of an owner or operator of the first vehicle system.

21. A vehicle system comprising:
an inverter device coupled with a motor, the inverter device configured to receive from the motor electric energy generated by dynamic braking of the motor;
an energy storage device coupled with the inverter device; and
a variable resistive component disposed between the inverter device and the energy storage device and configured to receive the electric energy conducted from the inverter device, the variable resistive component configured to control an amount and a direction of conduction of the electric energy from the inverter device toward two or more of the energy storage device, a resistive grid, or a system load, the variable resistive component disposed between the energy storage device and the resistive grid or the system load, the variable resistive component configured to direct a non-zero amount of a first portion of the electric energy towards the energy storage device and direct a non-zero second amount of a second portion of the electric energy towards one or more of the resistive grid or the system load, wherein the non-zero amount of the first portion of the electric energy and the non-zero amount of the second portion of the electric energy are based at least in part on a mode of operation of the variable resistive component,
wherein the mode of operation of the variable resistive component is configured to change based on a transfer rate of the electric energy conducted from the inverter device.

* * * * *